US011919364B2

(12) United States Patent
Xie et al.

(10) Patent No.: US 11,919,364 B2
(45) Date of Patent: Mar. 5, 2024

(54) INTEGRATED VEHICULAR SYSTEM FOR CONDITIONING AIR AND HEATING WATER

(71) Applicant: Bergstrom, Inc., Rockford, IL (US)

(72) Inventors: Dan Xie, Beijing (CN); Bin Bai, Shanghai (CN); Tingzhou Wu, Rockford, IL (US)

(73) Assignee: Bergstrom, Inc., Rockford, IL (US)

( * ) Notice: Subject to any disclaimer, the term of this patent is extended or adjusted under 35 U.S.C. 154(b) by 0 days.

(21) Appl. No.: 17/894,106

(22) Filed: Aug. 23, 2022

(65) Prior Publication Data
US 2022/0402327 A1      Dec. 22, 2022

Related U.S. Application Data

(62) Division of application No. 16/370,741, filed on Mar. 29, 2019, now Pat. No. 11,420,496.
(Continued)

(51) Int. Cl.
*B60H 1/00* (2006.01)
*B60H 1/32* (2006.01)
(Continued)

(52) U.S. Cl.
CPC ..... *B60H 1/00499* (2019.05); *B60H 1/00007* (2013.01); *B60H 1/00271* (2013.01);
(Continued)

(58) Field of Classification Search
CPC .............. F24D 17/001; F28D 11/0214; B60H 1/00007; B60H 1/00271; B60H 1/00328;
(Continued)

(56) References Cited

U.S. PATENT DOCUMENTS 2,722,050 A   11/1955 Shank
2,789,234 A    6/1956 Lambert et al.
(Continued)

FOREIGN PATENT DOCUMENTS

CN   1468409 A   1/2004
CN   2883071 Y   3/2007
(Continued)

OTHER PUBLICATIONS

Alfa Laval Website http://www.alfalaval.com/ecore-Java/WebObjects/ecoreJava.woa/wa/shoNode?siteNodeIID=1668&cont . . . ; date last visited May 18, 2007; 1 page.
(Continued)

*Primary Examiner* — Tho V Duong
(74) *Attorney, Agent, or Firm* — Morgan, Lewis & Bockius LLP

(57) ABSTRACT

The various embodiments described herein include methods, devices, and systems for conditioning air and heating water in a vehicle. In one aspect, a method includes: (1) obtaining a desired temperature for an interior of the vehicle; (2) obtaining a desired temperature for water in a water storage tank of the vehicle; (3) determining a current interior temperature; (4) and a current water temperature; (5) if the current water temperature is below the desired water temperature, and if the current interior temperature is below the desired interior temperature, operating a system in a first mode to concurrently heat the water and heat the interior; and (6) if the current water temperature is below the desired water temperature, and if the current interior temperature is above the desired interior temperature, operating the system in a second mode to concurrently heat the water and cool the interior.

18 Claims, 19 Drawing Sheets

Related U.S. Application Data

(60) Provisional application No. 62/753,823, filed on Oct. 31, 2018, provisional application No. 62/651,624, filed on Apr. 2, 2018.

(51) Int. Cl.
*F24H 1/00* (2022.01)
*F24H 4/04* (2006.01)

(52) U.S. Cl.
CPC ..... *B60H 1/00328* (2013.01); *B60H 1/00364* (2013.01); *B60H 1/00885* (2013.01); *B60H 1/3222* (2013.01); *F24H 1/009* (2013.01); *F24H 4/04* (2013.01); *B60H 2001/00307* (2013.01); *B60H 2001/00928* (2013.01); *B60H 2001/00935* (2013.01)

(58) Field of Classification Search
CPC ............ B60H 1/00364; B60H 1/00885; B60H 1/3222; F24H 1/009; F24H 4/04
See application file for complete search history.

(56) References Cited

U.S. PATENT DOCUMENTS

| | | |
|---|---|---|
| 3,176,502 A | 4/1965 | Cizek et al. |
| 3,225,819 A | 12/1965 | Stevens |
| 3,360,958 A | 1/1968 | Miner |
| 3,590,910 A | 7/1971 | Lorenz |
| 3,627,030 A | 12/1971 | Lorenz |
| 3,807,087 A | 4/1974 | Staats |
| 3,844,130 A | 10/1974 | Wahnish |
| 3,880,224 A | 4/1975 | Weil |
| 3,885,398 A | 5/1975 | Dawkins |
| 3,938,349 A | 2/1976 | Ueno |
| 3,948,060 A | 4/1976 | Gaspard |
| 3,995,443 A | 12/1976 | Iversen |
| 4,015,182 A | 3/1977 | Erdman |
| 4,034,801 A | 7/1977 | Bermstein |
| 4,071,080 A | 1/1978 | Bridgers |
| 4,217,764 A | 8/1980 | Armbruster |
| 4,266,405 A | 5/1981 | Trask |
| 4,271,677 A | 6/1981 | Harr |
| 4,280,330 A | 7/1981 | Harris et al. |
| 4,324,286 A | 4/1982 | Brett |
| 4,359,875 A | 11/1982 | Ohtani |
| 4,383,802 A | 5/1983 | Gianni et al. |
| 4,391,321 A | 7/1983 | Thunberg |
| 4,412,425 A | 11/1983 | Fukami et al. |
| 4,448,157 A | 5/1984 | Eckstein et al. |
| 4,459,519 A | 7/1984 | Erdman |
| 4,577,679 A | 3/1986 | Hibshman |
| 4,604,036 A | 8/1986 | Sutou et al. |
| 4,617,472 A | 10/1986 | Slavik |
| 4,641,502 A | 2/1987 | Aldrich et al. |
| 4,658,593 A | 4/1987 | Stenvinkel |
| 4,667,480 A | 5/1987 | Bessler |
| 4,694,798 A | 9/1987 | Kato et al. |
| 4,748,825 A | 6/1988 | King |
| 4,825,663 A | 5/1989 | Nijar et al. |
| 4,841,733 A | 6/1989 | Dussault et al. |
| 4,856,078 A | 8/1989 | Konopka |
| 4,893,479 A | 1/1990 | Gillett et al. |
| 4,897,798 A | 1/1990 | Cler |
| 4,905,478 A | 3/1990 | Matsuda et al. |
| 4,945,977 A | 8/1990 | D'Agaro |
| 4,947,657 A | 8/1990 | Kalmbach |
| 4,952,283 A | 8/1990 | Besik |
| 4,982,576 A | 1/1991 | Proctor et al. |
| 5,025,634 A | 6/1991 | Dressler |
| 5,046,327 A | 9/1991 | Walker |
| 5,067,652 A | 11/1991 | Enander |
| 5,095,308 A | 3/1992 | Hewitt |
| 5,125,236 A | 6/1992 | Clancey et al. |
| 5,170,639 A | 12/1992 | Datta |
| 5,205,781 A | 4/1993 | Kanno et al. |
| 5,230,719 A | 7/1993 | Berner et al. |
| 5,269,153 A | 12/1993 | Cawley |
| 5,275,012 A | 1/1994 | Dage et al. |
| 5,307,645 A | 5/1994 | Pannell |
| 5,316,074 A | 5/1994 | Isaji et al. |
| 5,324,229 A | 6/1994 | Weisbecker |
| 5,327,997 A | 7/1994 | Nash, Jr. et al. |
| 5,333,678 A | 8/1994 | Mellum et al. |
| 5,361,593 A | 11/1994 | Dauvergne |
| 5,376,866 A | 12/1994 | Erdman |
| 5,396,779 A | 3/1995 | Voss |
| 5,402,844 A | 4/1995 | Elluin |
| 5,404,730 A | 4/1995 | Westermeyer |
| 5,426,953 A | 6/1995 | Meckler |
| 5,465,589 A | 11/1995 | Bender et al. |
| 5,497,941 A | 3/1996 | Numazawa et al. |
| 5,501,267 A | 3/1996 | Iritani et al. |
| 5,502,365 A | 3/1996 | Nanbu et al. |
| 5,524,442 A | 6/1996 | Bergmen, Jr. et al. |
| 5,528,901 A | 6/1996 | Willis |
| 5,562,538 A | 10/1996 | Suyama |
| 5,586,613 A | 12/1996 | Ehsani |
| 5,605,058 A | 2/1997 | Kurachi |
| 5,641,016 A | 6/1997 | Isaji et al. |
| 5,647,534 A | 7/1997 | Kelz et al. |
| 5,657,638 A | 8/1997 | Erdman et al. |
| 5,682,757 A | 11/1997 | Peterson |
| 5,720,181 A | 2/1998 | Karl et al. |
| 5,727,396 A | 3/1998 | Boyd |
| 5,752,391 A | 5/1998 | Ozaki et al. |
| 5,761,918 A | 6/1998 | Jackson et al. |
| 5,775,415 A | 7/1998 | Yoshini et al. |
| 5,782,610 A | 7/1998 | Ikeda |
| 5,819,549 A | 10/1998 | Sherwood |
| 5,896,750 A | 4/1999 | Karl |
| 5,898,995 A | 5/1999 | Ghodbane |
| 5,899,081 A | 5/1999 | Evans et al. |
| 5,901,572 A | 5/1999 | Peiffer et al. |
| 5,901,780 A | 5/1999 | Zeigler et al. |
| 5,921,092 A | 7/1999 | Behr et al. |
| 5,934,089 A | 8/1999 | Magakawa et al. |
| 5,982,643 A | 11/1999 | Phlipot |
| 5,996,363 A | 12/1999 | Kurachi et al. |
| 6,016,662 A | 1/2000 | Tanaka et al. |
| 6,021,043 A | 2/2000 | Horng |
| 6,028,406 A | 2/2000 | Birk |
| 6,029,465 A | 2/2000 | Bascobert |
| 6,038,877 A | 3/2000 | Peiffer et al. |
| 6,038,879 A | 3/2000 | Turcotte |
| 6,059,016 A | 5/2000 | Rafalovich et al. |
| 6,072,261 A | 6/2000 | Lin |
| 6,073,456 A | 6/2000 | Kawai et al. |
| 6,111,731 A | 8/2000 | Cepynsky |
| 6,112,535 A | 9/2000 | Hollenbeck |
| 6,122,929 A | 9/2000 | Yamasaki |
| 6,125,642 A | 10/2000 | Seener et al. |
| 6,134,901 A | 10/2000 | Harvest et al. |
| 6,152,217 A | 11/2000 | Ito et al. |
| 6,185,959 B1 | 2/2001 | Zajac |
| 6,193,475 B1 | 2/2001 | Rozek |
| 6,205,795 B1 | 3/2001 | Backman et al. |
| 6,205,802 B1 | 3/2001 | Drucker et al. |
| 6,209,333 B1 | 4/2001 | Bascobert |
| 6,209,622 B1 | 4/2001 | Lagace et al. |
| 6,213,867 B1 | 4/2001 | Yazici |
| 6,230,507 B1 | 5/2001 | Ban et al. |
| 6,253,563 B1 | 7/2001 | Ewert et al. |
| 6,265,692 B1 | 7/2001 | Umebayahi et al. |
| 6,276,161 B1 | 8/2001 | Peiffer et al. |
| 6,282,919 B1 | 9/2001 | Rockenfeller |
| 6,318,103 B1 | 11/2001 | Rieger et al. |
| 6,351,957 B2 | 3/2002 | Hara |
| 6,405,793 B1 | 6/2002 | Ghodbane et al. |
| 6,411,059 B2 | 6/2002 | Frugier et al. |
| 6,453,678 B1 | 9/2002 | Sundhar |
| 6,457,324 B2 | 10/2002 | Zeigler et al. |
| 6,467,279 B1 | 10/2002 | Backman et al. |
| 6,474,081 B1 | 11/2002 | Feuerecker |

(56) References Cited

U.S. PATENT DOCUMENTS

| | | |
|---|---|---|
| 6,530,426 B1 | 3/2003 | Kishita et al. |
| 6,543,245 B1 | 4/2003 | Waldschmidt |
| 6,571,566 B1 | 6/2003 | Temple et al. |
| 6,575,228 B1 | 6/2003 | Ragland et al. |
| 6,626,003 B1 | 9/2003 | Kortüm et al. |
| 6,675,601 B2 | 1/2004 | Ebara |
| 6,684,863 B2 | 2/2004 | Dixon et al. |
| 6,725,134 B2 | 4/2004 | Dillen et al. |
| 6,745,585 B2 | 6/2004 | Kelm et al. |
| 6,748,750 B2 | 6/2004 | Choi |
| 6,758,049 B2 | 7/2004 | Adachi et al. |
| 6,889,762 B2 | 5/2005 | Zeigler et al. |
| 6,932,148 B1 | 8/2005 | Brummett et al. |
| 6,939,114 B2 | 9/2005 | Iwanami et al. |
| 6,965,818 B2 | 11/2005 | Koenig et al. |
| 6,981,544 B2 | 1/2006 | Iwanami et al. |
| 6,992,419 B2 | 1/2006 | Kim et al. |
| 7,131,281 B2 | 11/2006 | Salim et al. |
| 7,135,799 B2 | 11/2006 | Rittmeyer |
| 7,150,159 B1 | 12/2006 | Brummett et al. |
| 7,246,502 B2 | 7/2007 | Hammonds et al. |
| 7,316,119 B2 | 1/2008 | Allen |
| 7,350,368 B2 | 4/2008 | Heberle et al. |
| 7,385,323 B2 | 6/2008 | Takahashi et al. |
| 7,591,143 B2 | 9/2009 | Zeigler et al. |
| 7,591,303 B2 | 9/2009 | Ziegler et al. |
| 7,614,242 B1 | 11/2009 | Quesada Saborio |
| 7,637,031 B2 | 12/2009 | Salim et al. |
| 7,765,824 B2 | 8/2010 | Wong et al. |
| 7,821,175 B2 | 10/2010 | Ionel et al. |
| 7,932,658 B2 | 4/2011 | Ionel |
| 8,001,799 B2 | 8/2011 | Obayashi et al. |
| 8,141,377 B2 | 3/2012 | Connell |
| 8,156,754 B2 | 4/2012 | Hong et al. |
| 8,276,892 B2 | 10/2012 | Narikawa et al. |
| 8,492,948 B2 | 7/2013 | Wang et al. |
| 8,517,087 B2 | 8/2013 | Zeigler et al. |
| 8,821,092 B2 | 9/2014 | Nambara et al. |
| 8,841,813 B2 | 9/2014 | Junak et al. |
| 8,905,071 B2 | 12/2014 | Coombs et al. |
| 8,919,140 B2 | 12/2014 | Johnson et al. |
| 8,947,531 B2 | 2/2015 | Fischer et al. |
| 9,157,670 B2 | 10/2015 | Kreeley et al. |
| 9,216,628 B2 | 12/2015 | Self et al. |
| 9,221,409 B1 | 12/2015 | Gauthier et al. |
| 9,327,578 B2 | 5/2016 | Itoh |
| 9,670,933 B2 | 6/2017 | Yoo et al. |
| 9,783,024 B2 | 10/2017 | Connell et al. |
| 9,878,591 B2 | 1/2018 | Taniguchi et al. |
| 10,267,546 B2 | 4/2019 | Evans et al. |
| 2001/0010261 A1 | 8/2001 | Oomura et al. |
| 2001/0013409 A1 | 8/2001 | Burk |
| 2001/0015070 A1 | 8/2001 | Junichiro |
| 2002/0020183 A1 | 2/2002 | Hayashi |
| 2002/0026801 A1 | 3/2002 | Yamashita |
| 2002/0036081 A1 | 3/2002 | Ito et al. |
| 2002/0042248 A1 | 4/2002 | Vincent et al. |
| 2002/0078700 A1 | 6/2002 | Kelm et al. |
| 2002/0078705 A1 | 6/2002 | Schlosser |
| 2002/0084769 A1 | 7/2002 | Iritani et al. |
| 2002/0108384 A1 | 8/2002 | Higashiyama |
| 2002/0112489 A1 | 8/2002 | Egawa et al. |
| 2002/0157412 A1 | 10/2002 | Iwanami et al. |
| 2002/0157413 A1 | 10/2002 | Iwanami et al. |
| 2003/0041603 A1 | 3/2003 | Tada et al. |
| 2003/0105567 A1 | 6/2003 | Koenig et al. |
| 2003/0106332 A1 | 6/2003 | Okamoto |
| 2004/0060312 A1 | 4/2004 | Horn et al. |
| 2004/0079098 A1 | 4/2004 | Uno et al. |
| 2004/0112074 A1 | 6/2004 | Komura et al. |
| 2004/0168449 A1 | 9/2004 | Homan et al. |
| 2004/0216477 A1 | 11/2004 | Yamasaki et al. |
| 2004/0221599 A1 | 11/2004 | Hille et al. |
| 2004/0250560 A1 | 12/2004 | Ikura et al. |
| 2004/0256082 A1 | 12/2004 | Bracciano |
| 2005/0016196 A1 | 1/2005 | Kadle et al. |
| 2005/0109499 A1 | 5/2005 | Iwanami et al. |
| 2005/0161211 A1 | 7/2005 | Zeigler et al. |
| 2005/0230096 A1 | 10/2005 | Yamaoka |
| 2005/0235660 A1 | 10/2005 | Pham |
| 2005/0257545 A1 | 11/2005 | Ziehr et al. |
| 2006/0042284 A1 | 3/2006 | Heberle et al. |
| 2006/0080980 A1 | 4/2006 | Lee et al. |
| 2006/0102333 A1 | 5/2006 | Zeigler et al. |
| 2006/0118290 A1 | 6/2006 | Klassen et al. |
| 2006/0151163 A1 | 7/2006 | Zeigler et al. |
| 2006/0151164 A1 | 7/2006 | Zeigler et al. |
| 2006/0254309 A1 | 11/2006 | Takeuchi et al. |
| 2006/0277936 A1 | 12/2006 | Norden et al. |
| 2007/0039336 A1 | 2/2007 | Wu |
| 2007/0070605 A1 | 3/2007 | Straznicky et al. |
| 2007/0101760 A1 | 5/2007 | Bergander |
| 2007/0103014 A1 | 5/2007 | Sumiya et al. |
| 2007/0131408 A1 | 6/2007 | Zeigler et al. |
| 2007/0144723 A1 | 6/2007 | Aubertin et al. |
| 2007/0144728 A1 | 6/2007 | Kinmartin et al. |
| 2007/0163276 A1 | 7/2007 | Braun et al. |
| 2007/0227167 A1 | 10/2007 | Shapiro |
| 2007/0251256 A1 | 11/2007 | Pham |
| 2007/0295017 A1* | 12/2007 | Pannell ............... B60H 1/00364 62/239 |
| 2008/0017347 A1 | 1/2008 | Chung et al. |
| 2008/0110185 A1 | 5/2008 | Veettil et al. |
| 2008/0156887 A1 | 7/2008 | Stanimirovic |
| 2008/0196436 A1 | 8/2008 | Connell |
| 2008/0196877 A1 | 8/2008 | Zeigler et al. |
| 2008/0209924 A1 | 9/2008 | Yoon et al. |
| 2008/0295535 A1 | 12/2008 | Robinet |
| 2009/0140590 A1 | 6/2009 | Hung |
| 2009/0211280 A1 | 8/2009 | Alston |
| 2009/0229288 A1 | 9/2009 | Alston et al. |
| 2009/0241592 A1 | 10/2009 | Stover |
| 2009/0249802 A1 | 10/2009 | Nemesh et al. |
| 2009/0301702 A1 | 12/2009 | Zeigler et al. |
| 2010/0009620 A1 | 1/2010 | Kawato et al. |
| 2010/0019047 A1 | 1/2010 | Flick |
| 2010/0127591 A1 | 5/2010 | Court et al. |
| 2010/0186433 A1 | 7/2010 | Galante et al. |
| 2010/0218530 A1 | 9/2010 | Melbostad et al. |
| 2010/0263395 A1 | 10/2010 | Adachi et al. |
| 2010/0293966 A1 | 11/2010 | Yokomachi |
| 2010/0297517 A1 | 11/2010 | Maier |
| 2011/0000240 A1 | 1/2011 | Yamada |
| 2011/0088417 A1 | 4/2011 | Kayser |
| 2011/0120146 A1 | 5/2011 | Ota et al. |
| 2011/0126566 A1 | 6/2011 | Jones et al. |
| 2011/0174014 A1 | 7/2011 | Scarcella et al. |
| 2011/0308265 A1 | 12/2011 | Phannavong |
| 2012/0023982 A1 | 2/2012 | Berson et al. |
| 2012/0102779 A1 | 5/2012 | Beers et al. |
| 2012/0118532 A1 | 5/2012 | Jentzsch et al. |
| 2012/0133176 A1 | 5/2012 | Ramberg |
| 2012/0247135 A1 | 10/2012 | Fakieh |
| 2012/0297805 A1 | 11/2012 | Kamada et al. |
| 2012/0318014 A1 | 12/2012 | Huff et al. |
| 2013/0040549 A1 | 2/2013 | Douglas et al. |
| 2013/0091867 A1 | 4/2013 | Campbell et al. |
| 2013/0145781 A1 | 6/2013 | Liu |
| 2013/0167577 A1 | 7/2013 | Street |
| 2013/0181556 A1 | 7/2013 | Li et al. |
| 2013/0298583 A1 | 11/2013 | O'Donnell |
| 2013/0319630 A1 | 12/2013 | Yamamoto |
| 2014/0066572 A1 | 3/2014 | Corveleyn |
| 2014/0075970 A1* | 3/2014 | Benson ............... F02C 1/05 62/238.7 |
| 2014/0075973 A1 | 3/2014 | Graaf et al. |
| 2014/0102679 A1 | 4/2014 | Matsudaira et al. |
| 2014/0223939 A1* | 8/2014 | Nasuta ............... F25B 30/02 62/160 |
| 2014/0241926 A1 | 8/2014 | Fraser |
| 2014/0245770 A1* | 9/2014 | Chen ............... F25B 49/02 62/238.7 |
| 2014/0260358 A1 | 9/2014 | Leete et al. |
| 2014/0260403 A1 | 9/2014 | Connell |

(56) References Cited

U.S. PATENT DOCUMENTS

| | | |
|---|---|---|
| 2014/0290299 A1 | 10/2014 | Nakaya |
| 2014/0291411 A1* | 10/2014 | Tamaki .................. F24D 17/02 62/238.7 |
| 2015/0059367 A1 | 3/2015 | Emo et al. |
| 2015/0064639 A1 | 3/2015 | Dumbreck |
| 2015/0158368 A1 | 6/2015 | Herr-Rathke et al. |
| 2015/0202986 A1 | 7/2015 | Hatakeyama |
| 2015/0210287 A1 | 7/2015 | Penilla et al. |
| 2015/0236525 A1 | 8/2015 | Aridome |
| 2015/0239365 A1 | 8/2015 | Hyde et al. |
| 2015/0306937 A1 | 10/2015 | Kitamura et al. |
| 2015/0330675 A1* | 11/2015 | Tamaki .................. F25B 13/00 62/324.1 |
| 2016/0089958 A1 | 3/2016 | Powell |
| 2016/0144685 A1 | 5/2016 | Ochiai et al. |
| 2016/0146554 A1 | 5/2016 | Bhatia et al. |
| 2016/0159199 A1* | 6/2016 | Kuroda ..................... F25B 6/02 165/42 |
| 2016/0229266 A1 | 8/2016 | Maeda et al. |
| 2017/0067676 A1 | 3/2017 | Munk et al. |
| 2017/0211829 A1* | 7/2017 | Slack .................. G05D 23/1923 |
| 2017/0211855 A1 | 7/2017 | Fraser et al. |
| 2017/0350632 A1 | 12/2017 | Hirao |
| 2018/0001731 A1 | 1/2018 | Vehr |

FOREIGN PATENT DOCUMENTS

| | | |
|---|---|---|
| CN | 201872573 U | 6/2011 |
| CN | 102398496 A | 4/2012 |
| CN | 103547466 A | 1/2014 |
| CN | 104105610 A | 10/2014 |
| CN | 105071563 A | 11/2015 |
| CN | 105186726 A | 11/2015 |
| DE | 4440044 A1 | 5/1996 |
| DE | 197 45 028 A1 | 4/1999 |
| DE | 10014483 A1 | 11/2000 |
| DE | 199 42 029 A | 3/2001 |
| DE | 199 54 308 A1 | 7/2001 |
| DE | 102005004950 A1 | 8/2006 |
| DE | 10 2007 028851 A1 | 12/2008 |
| DE | 102010054965 A1 | 6/2012 |
| DE | 10 2012 022564 A1 | 5/2014 |
| DE | 11 2015 000552 | 11/2016 |
| EP | 0516413 A1 | 12/1992 |
| EP | 0958952 A1 | 11/1999 |
| EP | 1024038 A2 | 8/2000 |
| EP | 1 400 764 A1 | 3/2004 |
| EP | 1 477 748 A1 | 11/2004 |
| EP | 1 700 725 A1 | 9/2006 |
| EP | 1 703 231 A1 | 9/2006 |
| EP | 1 970 651 A1 | 9/2008 |
| EP | 2048011 A1 | 4/2009 |
| EP | 2196748 A2 | 6/2010 |
| EP | 2320160 A1 | 5/2011 |
| EP | 2894420 A1 | 7/2015 |
| EP | 0963895 A2 | 12/2015 |
| EP | 3118035 A1 | 1/2017 |
| FR | 2966391 A1 | 4/2012 |
| JP | H02-128915 A | 5/1990 |
| JP | 5032121 A | 2/1993 |
| JP | H07186711 A | 7/1995 |
| JP | H97-76740 A | 3/1997 |
| JP | H09318177 A | 12/1997 |
| JP | H10281595 A | 10/1998 |
| JP | 2000108651 A | 4/2000 |
| JP | 2005044551 A | 4/2000 |
| JP | 2002081823 A | 3/2002 |
| JP | 2005-033941 A | 2/2005 |
| JP | 2005-081960 A | 3/2005 |
| JP | 2006-264568 A | 10/2006 |
| JP | 2008220043 A | 9/2008 |
| JP | 2012017029 A | 1/2012 |
| JP | 2014226979 A | 12/2014 |
| KR | 20090068136 A | 6/2009 |
| WO | WO 89/09143 A1 | 10/1989 |
| WO | WO 99/61269 | 12/1999 |
| WO | WO 00/00361 | 1/2000 |
| WO | WO 2004/011288 A1 | 2/2004 |
| WO | WO 2006/082082 A1 | 8/2006 |
| WO | WO 2012/158326 A1 | 11/2012 |
| WO | WO 2013/113308 A1 | 8/2013 |
| WO | WO 2014/112320 A1 | 7/2014 |
| WO | WO 2014/180749 A1 | 11/2014 |
| WO | WO 2014/209780 A1 | 12/2014 |
| WO | WO 2015/076872 A1 | 5/2015 |

OTHER PUBLICATIONS

Anonymous: "NITE Connected Climate Controlled Transport Monitoring/Mobile Internet of Things UI Design/Mobil UI: Progress/Printeres/Internet of Things, User Inter . . . ," Oct. 19, 2016 retrieved from: URL:htps://za.pinterest.com/pin/192810427773981541/, 1 pg.

Bergstrom, Inc., International Search Report and Written Opinion, PCT/US2014/026687, dated Jul. 28, 2014, 12 pgs.

Bergstrom, Inc., International Preliminary Report on Patentability, PCT/US2014/026687, dated Sep. 15, 2015, 7 pgs.

Bergstrom, Inc., International Search Report and Written Opinion, PCT/US2014/026683, dated Jul. 3, 2014 12 pgs.

Bergstrom, Inc., International Preliminary Report on Patentability, PCT/US2014/026683, dated Sep. 15, 2015, 6 pgs.

Bergstrom, Inc., International Search Report and Written Opinion, PCT/US2013/068331, dated Nov. 7, 2014, 9 pgs.

Bergstrom, Inc., International Preliminary Report on Patentability, PCT/US2013/068331, dated May 10, 2016, 6 pgs.

Bergstrom, Inc., International Search Report and Written Opinion, PCT/US2016/021602, dated Nov. 3, 2016, 7 pgs.

Bergstrom, Inc., International Preliminary Report on Patentability, PCT/US2016/021602, dated Sep. 12, 2017, 11 pgs.

Bergstrom, Inc., International Search Report and Written Opinion, PCT/US2017/021346, dated Jul. 25, 2017, 11 pgs.

Bergstrom, Inc., International Search Report and Written Opinion, PCT/US2016/065812, dated Mar. 22, 2017, 12 pgs.

Bergstrom, Inc., International Preliminary Report on Patentability, PCT/US2016/065812, dated Jun. 12, 2018, 8 pgs.

Bergstrom, Inc., International Search Report and Written Opinion, PCT/US2018/044093, dated Oct. 25, 2018, 13 pgs.

Bergstrom, Inc., International Search Report and Written Opinion, PCT/US2017049859, dated Nov. 12, 2017, 4 pgs.

Bergstrom, Inc., International Preliminary Report on Patentability, PCT/US2017049859, dated Mar. 5, 2019, 6 pgs.

Bergstrom, Inc., International Search Report and Written Opinion PCT/US2017053196, dated Sep. 3, 2018, 17 pgs.

Bergstrom, Inc., International Preliminary Report on Patentability, PCT/US2017053196, dated Apr. 2, 2019, 11 pgs.

Bergstrom, Inc., International Search Report and Written Opinion PCT/US2016/423326, dated Sep. 27, 2016, 8 pgs.

Bergstrom, Inc., International Preliminary Report on Patentability PCT/US2016/423326, dated Jan. 16, 2018, 7 pgs.

Bergstrom, Inc., International Search Report and Written Opinion PCT/US2016/42307, dated Oct. 7, 2016, 8 pgs.

Bergstrom, Inc., International Preliminary Report on Patentability PCT/US2016/42307, dated Jan. 16, 2018, 7 pgs.

Bergstrom, Inc., International Search Report and Written Opinion PCT/US2016/42314, dated Sep. 30, 2016, 7 pgs.

Bergstrom, Inc., International Preliminary Report on Patentability, PCT/US2016/42314, dated Jan. 16, 2018, 6 pgs.

Bergstrom, Inc., International Search Report and Written Opinion PCT/US2016/42329, dated Sep. 30, 2016, 6 pgs.

Bergstrom, Inc., International Preliminary Report on Patentability PCT/US2016/42329, dated Jan. 16, 2018, 5 pgs.

Bergstrom, Inc., Communication Pursuant to Rules 161(2) and 162 EPC, EP14717604.4, dated Oct. 23, 2015, 2 pgs.

Bergstrom, Inc., Communication Pursuant to Article 94(3), EP14717604.4, dated Jun. 2, 2017, 12 pgs.

Bergstrom, Inc., Communication Pursuant to Article 94(3), EP14717604.4, dated Feb. 4, 2019, 5 pgs.

(56) References Cited

OTHER PUBLICATIONS

Bergstrom, Inc., Communication Pursuant to Rules 161(2) and 162 EPC, EP14722438.0, dated Nov. 2, 2015. 2 pgs.
Bergstrom, Inc. Communication Pursuant to Article 94(3), EP14722438.0, dated Jan. 24, 2018, 5 pgs.
Bergstrom, Inc., Communication Pursuant to Rules 161(2) and 162 EPC, EP13795064.8, dated Jun. 22, 2016, 2 pgs.
Bergstrom, Inc. Extended European Search Report, EP16204254.3, dated Jul. 25, 2017, 8 pgs.
Bergstrom, Inc. Partial European Search Report, EP16204259.2, dated May 30, 2017, 14 pgs.
Bergstrom, Inc. Extended European Search Report, EP16204259.2, dated Oct. 25, 2017, 15 pgs.
Bergstrom, Inc. Corrected Extended European Search Report, EP16204259.2, dated Nov. 24, 2017, 15 pgs.
Bergstrom, Inc. Partial European Search Report, EP16204256.8, dated Jul. 13, 2017, 14 pgs.
Bergstrom, Inc. Extended European Search Report, EP16204256.8, dated Jan. 12, 2018, 11 pgs.
Bergstrom, Inc. Extended European Search Report, EP16204256.8, dated Dec. 1, 2017, 13 pgs.
Bergstrom, Inc. Extended European Search Report, EP16204267.5, dated Jul. 11, 2017, 8 pgs.
Bergstrom, Inc., Communicaton Pursuant to Article 94(3), EP16820096.2, dated Aug. 12, 2019, 7 pgs.
Bergstrom, Inc. Extended European Search Report, EP18177850.7, dated Nov. 28, 2018. 8 pgs.
Bergstrom, Inc., Communication Pursuant to Rules 161(1) and 162, EP17780954.8, dated May 10, 2019, 3 pgs.
Bergstrom, Inc., Extended European Search Report, EP19166779.9, dated Aug. 30, 2019, 8 pgs.
Bergstrom, Inc., Office Action, CN201480027137.4, dated Mar. 3, 2017, 15 pgs.
Bergstrom, Inc., 2nd Office Action, CN201480027137.4, dated Jul. 13, 2017, 10 pgs.
Bergstrom, Inc., 3rd Office Action, CN201480027137.4, dated Jan. 17, 2018, 19 pgs.
Bergstrom, Inc., 4th Office Action, CN201480027137.4, dated Jul. 26, 2018, 8 pgs.
Bergstrom, Inc., Notification of Grant, CN201480027137.4, dated Feb. 21, 2019, 1 pg.
Bergstrom, Inc., Patent Certificate CN201480027137.4, May 31, 2019, 4 pgs.
Bergstrom, Inc., Office Action, CN201480027117.7, dated Mar. 9, 2017, 8 pgs.
Bergstrom, Inc., Patent Certificate, CN201480027117.7, Nov. 21, 2017, 3 pgs.
Bergstrom, Inc., 2nd Office Action, CN201380081940.1, dated Jan. 17, 2018, 13 pgs.
Bergstrom, Inc., 3rd Office Action, CN201380081940.1, dated Jul. 31, 2018, 7 pgs.
Bergstrom, Inc., 1st Office Action, CN201680002224.3, dated Dec. 11, 2018, 5 pgs.
Bergstrom, Inc., Letters Patent, CN201680002224.3, Sep. 10, 2019, 2 pgs.
Connell, Office Action, U.S. Appl. No. 14/209,877, dated Nov. 27, 2015, 19 pgs.
Connell, Final Office Action, U.S. Appl. No. 14/209,877, dated Jun. 22, 2016, 17 pgs.
Connell, Office Action, U.S. Appl. No. 14/209,877, dated Dec. 29, 2016, 21 pgs.
Connell, Notice of Allowance, U.S. Appl. No. 14/209,877, dated May 16, 2017, 5 pgs.
Connell, Notice of Allowance, U.S. Appl. No. 14/209,877, dated Aug. 4, 2017, 7 pgs.
Connell, Office Action, U.S. Appl. No. 14/209,961, dated Dec. 2, 2015, 14 pgs.
Connell, Final Office Action, U.S. Appl. No. 14/209,961, dated Jul. 25, 2016, 15 pgs.
Connell, Notice of Allowance, U.S. Appl. No. 14/209,961, dated Jun. 15, 2017, 10 pgs.
Connell, Notice of Allowance, U.S. Appl. No. 15/064,552, dated Jun. 1, 2017, 9 pgs.
Connell, Notice of Allowance, U.S. Appl. No. 14/995,119, dated Aug. 31, 2017, 7 pgs.
Connell, Office Action, U.S. Appl. No. 14/965,142, dated Aug. 29, 2017, 12 pgs.
Connell, Notice of Allowance, U.S. Appl. No. 14/965,142, dated Feb. 26, 2018, 8 pgs.
Connell, Office Action, U.S. Appl. No. 15/280,876, dated Dec. 14, 2017, 23 pgs.
Connell, Notice of Allowance, U.S. Appl. No. 15/280,876, dated Jun. 21, 2018, 9 pgs.
Connell, Office Action, U.S. Appl. No. 15/791,243, dated May 8, 2018, 12 pgs.
Connell, Office Action, U.S. Appl. No. 15/065,745, dated May 31, 2018, 44 pgs.
Connell, Final Office Action, U.S. Appl. No. 15/065,745, dated Dec. 17, 2018, 27 pgs.
Connell, Office Action, U.S. Appl. No. 15/065,745, dated May 9, 2019, 28 pgs.
Connell, Notice of Allowance, U.S. Appl. No. 15/065,745, dated Nov. 14, 2019, 9 pgs.
Connell, Office Action, U.S. Appl. No. 15/283,150, dated Sep. 27, 2018, 21 pgs.
Connell, Notice of Allowance, U.S. Appl. No. 15/283,150, dated Mar. 22, 2019, 8 pgs.
Connell, Office Action, dated Oct. 19, 2018, U.S. Appl. No. 15/722,860, 7 pgs.
Connell, Notice of Allowance, dated Feb. 7, 2019, U.S. Appl. No. 15/722,860, 5 pgs.
Connell, Notice of Allowance, dated May 20, 2019, U.S. Appl. No. 15/722,860, 5 pgs.
Connell, Notice of Allowance, U.S. Appl. No. 15/791,243, dated Jan. 24, 2019, 7 pgs.
Connell, Notice of Allowance, U.S. Appl. No. 15/791,243, dated May 15, 2019, 7 pgs.
Connell, Office Action, dated Apr. 18, 2019, U.S. Appl. No. 15/816,993, 17 pgs.
Connell, Notice of Allowance, dated Sep. 26, 2019, U.S. Appl. No. 15/816,993, 8 pgs.
Connell, Office Action, U.S. Appl. No. 15/439,865, dated Sep. 24, 2019, 6 pgs.
Connell, Office Action, U.S. Appl. No. 15/660,734, dated Oct. 30, 2019, 24 pgs.
Connell, Office Action, U.S. Appl. No. 16/941,495, dated Feb. 1, 2022, 12 pgs.
Connell, Notice of Allowance, U.S. Appl. No. 16/941,495, dated Jul. 5, 2022, 8 pgs.
Connell, Office Action, U.S. Appl. No. 17/560,216, dated Nov. 21, 2022, 10 pgs.
Connell, Notice of Allowance, U.S. Appl. No. 17/560,216, dated Mar. 9, 2023, 8 pgs.
Connell, Office Action, U.S. Appl. No. 17/224,052, dated Feb. 6, 2023, 8 pgs.
Connell, Notice of Allowance, U.S. Appl. No. 17/224,052, dated Jun. 2, 2023, 5 pgs.
Connell, Notice of Allowance, U.S. Appl. No. 16/922,855, Jun. 20, 2022, 8 pgs.
Connell, Office Action, U.S. Appl. No. 18/071,517, dated Jul. 7, 2023, 18 pgs.
FlatPlate Heat Exchangers; GEA FlatPiate Inc.; website—http://www.flatplate.com/profile.html; date last visited Aug. 9, 2007; 3 pages.
Glacier Bay Inc., Glacier Bay's Home Page, page printed from a website, htt( ?: i/web.archive.org/web/19990417062255/htt[2://www.glacierbay.com/, apparent archive date: Apr. 17, 1999, 1 page.
Glacier Bay Inc., Darpa/Glacier Bay ECS, pages printed from a website, httir//web.archive.org/web/19991104132941/wvvw.glacierbay.com/darQatxt. htm, apparent archive date: Nov. 4, 1999, 2 pages.
Glacier Bay Inc., Glacier Bay ECS DARPA Project—Final Report, pages printed from a website, http://web.archive.or_gjweb/

(56) References Cited

OTHER PUBLICATIONS

19991103001512/v•vww ,_g.Jacierbay.com/Darnhtm.htm, apparent archive date: Nov. 3, 1999, 9 pages.
Glacier Bay Inc., Glacier Bay ECS DARPA Project—Project Photos, pages printed from a website, http://web.archive.org/web/19991103012854/www .glacierbay.com/Dargghotos.htm, apparent archive date: Nov. 3, 1999, 2 pages.
Glacier Bay Inc., Glacier Bay ECS DARPA Project—Operational Video, page printed from a website, httQ://web.archive.orq/web/19991022221040/wvvw .qlacierbay.com/DarQvid.htm, apparent archive date Oct. 22, 1999; 1 page.
Glacier Bay Inc., R & D, pages printed from a website, htt ://web.archive.org/web/20000121130306/www.glacierbay.com/R&D. htm, apparent archive date: Jan. 21, 2000, 2 pages.
Glacier Bay Inc., Company History, pages printed from a website, http://web.archive.org/web/20000301153828/www .glacierbay.com/History:.htrn, apparent archive date: Mar. 1, 2000; 2 pages.
Glacier Bay Inc., Contact, page printed from a website, httQ://web.archive.org/web/19990508104511/W\'I!V .qlacierba:t.com/Contact. htm, apparent archive date: May 8, 1999; 1 page.
Hansson, Office Action dated Oct. 5, 2018, U.S. Appl. No. 15/256,109, 14 pgs.
Hansson, Final Office Action, U.S. Appl. No. 15/256,109, dated May 2, 2019, 14 pgs.
Hansson, Notice of Allowance, U.S. Appl. No. 15/256,109, dated Sep. 24, 2019, 9 pgs.
Michael Löhle, Günther Feuerecker and Ulrich Salzer; Non Idling HVAC-modufe tor Long Distance Trucks;SAE TechnicalPaper Series 1999-01-1193; International Congress and Exposition, Detroit, Michigan; Mar. 1-4, 1999; 8 pages.
Mahmoud Ghodbane; On Vehicle Performance of a Secondary Loop A/C System; SAE Technical Paper Series 2000-01-1270; SAE 2000 World Congress, Detroit, Michigan; Mar. 6-9, 2000; 6 pages.
Masami Konaka and Hiroki Matsuo; SAE Technical Paper Series 2000-01-1271; SAE 2000 World Congress, Detroit, Michigan; Mar. 6-9, 2000; 6 pages.
Mayo Mayo, Office Action, U.S. Appl. No. 15/034,517, dated Feb. 21, 2018, 22 pgs.
Mayo Mayo, Final Office Action, U.S. Appl. No. 15/034,517, dated Aug. 28, 2018, 9 pgs.
Mayo Mayo, Final Office Action, U.S. Appl. No. 15/034,517, dated Nov. 30, 2018, 7 pgs.
Frank Stodolsky, Linda Gaines, and Anant Vyas; Analysis of Technology Options to Reduce the Fuel Consumption of Idling Trucks; Paper-Center for Transportation Research, Energy Systems Division, Argonne National Laboratory,9700 South Cass Avenue, Argonne, Illinois 60439;Jun. 2000; 30 pages.
Paper No. 26 in IPR2012-00027, Jun. 11, 2013, 12 pgs. (U.S. Pat. No. 7,591,303).
Patricia Gardie and Vincent Goetz; Thermal Energy Storage System by Solid Absorption for Electric Automobile Heating and Air-Conditioning; Paper; 5 pages.
TropiCool No-idle Heating & Cooling, 110V/12V High-efficiency, Self-contained, Electrified Heating/AC System; ACC Climate Control Brochure, Elkhart, Indiana; 205, 1 page.
TropiCool Power Plus, More comfort. More efficiency. More options.; ACC Climate Control Brochure, Elkhart, Indiana; 2006, 3 pages.
TYCO Electronics Corporation, "MAG-MATE Connector with Multispring Pin," Datasheet, 2013, pp. 1-2 from <URL: http://datasheet.octopart.com/1247003-2-TE-Connectivity-datasheet-14918754.pdf>.
Packless Industries, the leader in refrigerant to water coaxial heat exchangers, flexible hoses and sucti . . . ; website—http://www.packless.com/profile.htmle: date last visited Aug. 9, 2007; 1 page.
Xei, Office Action, U.S. Appl. No. 16/370,741, dated Jun. 29, 2021, 17 pgs.
Xie, Final Office Action, U.S. Appl. No. 16/370,741, dated Dec. 1, 2021, 7 pgs.
Xei, Notice of Allowance, U.S. Appl. No. 16/370,741, dated Apr. 18, 2022, 8 pgs.
Zeigler, Office Action, U.S. Appl. No. 13/661,519, dated Mar. 11, 2013, 8 pgs.
Zeigler, Final Office Action, U.S. Appl. No. 13/661,519, dated Sep. 18, 2013, 15 pgs.
Zeigler, Office Action, U.S. Appl. No. 13/661,519, dated Apr. 9, 2014, 20 pgs.
Zeigler, Final Office Action, U.S. Appl. No. 13/661,519, dated Sep. 26, 2014, 23 pgs.
Zeigler, Office Action, U.S. Appl. No. 13/661,519, dated Oct. 28, 2015, 20 pgs.
Zeigler, Notice of Allowance, U.S. Appl. No. 13/661,519, dated Jun. 17, 2016, 8 pgs.
Zeigler, Office Action, U.S. Appl. No. 16/046,711, dated Feb. 6, 2020, 17 pgs.
Zeigler, Final Office Action, U.S. Appl. No. 16/046,711, dated Jul. 23, 2020, 17 pgs.
Zeigler, Advisory Action, U.S. Appl. No. 16/046,711, dated Oct. 27, 2020, 5 pgs.
Zeigler, Office Action, U.S. Appl. No. 16/046,711, dated Aug. 31, 2021, 16 pgs.
Zeigler, Office Action, U.S. Appl. No. 17/948,999, dated May 1, 2023, 24 pgs.

* cited by examiner

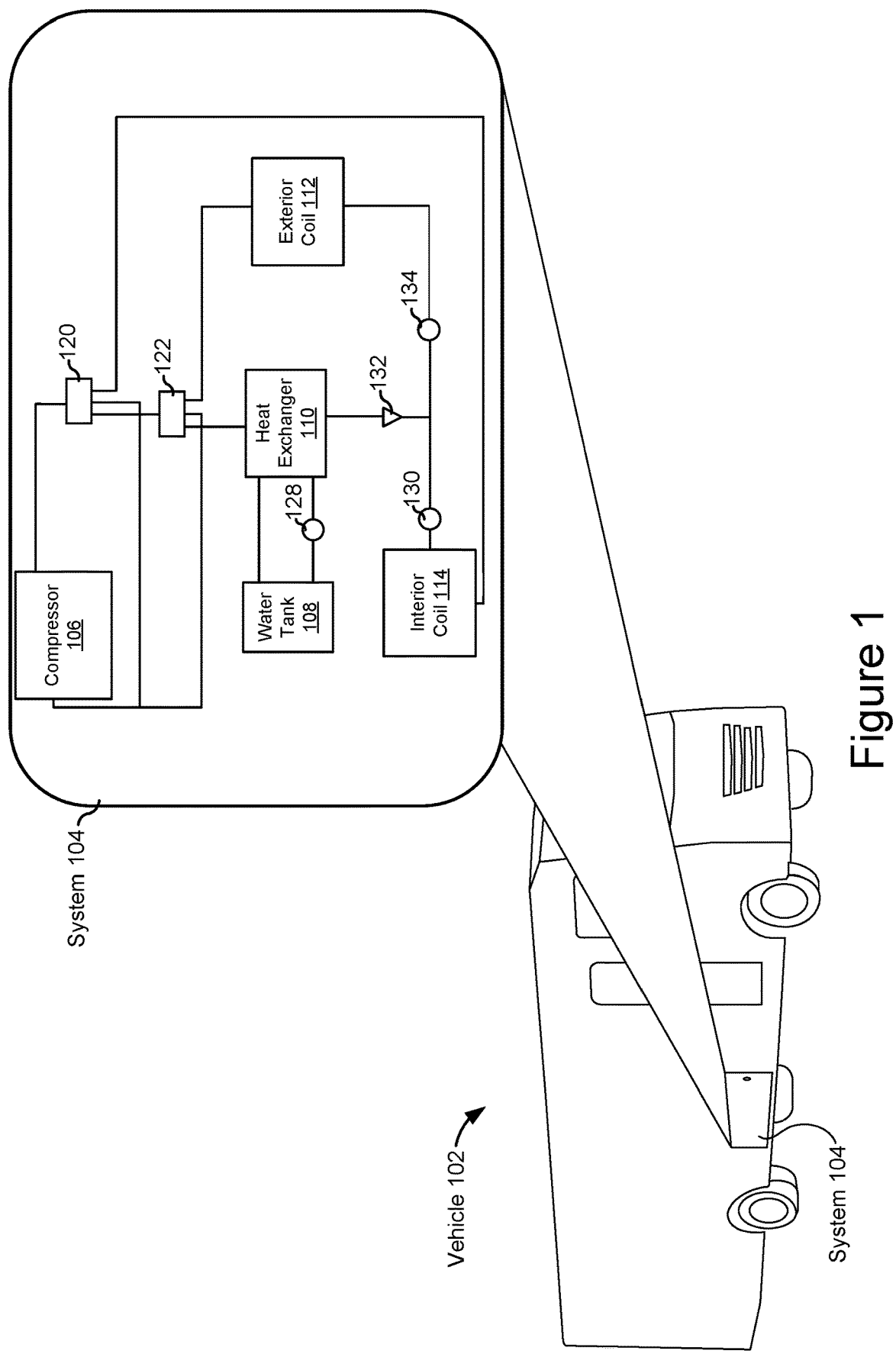

INTEGRATED VEHICULAR SYSTEM FOR CONDITIONING AIR AND HEATING WATER

PRIORITY

This application is a divisional of U.S. patent application Ser. No. 16/370,741, filed Mar. 29, 2019, entitled "Integrated Vehicular System For Conditioning Air And Heating Water," which claims priority to: (i) U.S. Provisional Patent Application No. 62/753,823, filed Oct. 31, 2018, entitled "Integrated Vehicular System for Conditioning Air and Heating Water," and (ii) U.S. Provisional Patent Application No. 62/651,624, filed Apr. 2, 2018, entitled "Integrated Vehicular Heating, Cooling, and Hot Water System," each of which is incorporated by reference in its entirety.

TECHNICAL FIELD

This relates generally to vehicular air conditioning systems, including but not limited to, an integrated system for conditioning air and heating water within a vehicle.

BACKGROUND

Recreational vehicles traditionally provide heating, air conditioning, and hot water functions. Each of these systems can be costly and require considerable space, energy, and installation time. Moreover, each system adds to the weight of the vehicle and may be difficult to access for maintenance purposes.

SUMMARY

Accordingly, there is a need for systems and/or devices with more efficient and effective methods for conditioning air and heating water within a vehicle. Such systems, devices, and methods optionally complement or replace conventional systems, devices, and methods for conditioning air and heating water within a vehicle.

The present disclosure describes vehicle-mounted integrated heating, ventilation and air conditioning (HVAC) and water heating systems (e.g., utilizing an air-source heat pump) to provide efficient heating and cooling for vehicles such as recreational vehicles (RVs). In some embodiments, the integrated system includes an air-source heat pump (e.g., with enhanced vapor injection (EVI) technology). In various embodiments, the system is configured to utilize different types of heat pumps, such as split or packaged, multi-zone, single zone, and the like. In some embodiments, the system includes one or more of: a compressor, two coils made of tubing fin or microchannel (e.g., one interior coil and one exterior coil), a tube in tube coil, expansion valves, a water pump, a water tank, and a plurality of check valves.

In some embodiments, in a heating mode, liquid refrigerant in the outside coils extracts heat from the air and converts into a gaseous refrigerant. In some embodiments, the indoor coil (or tube in tube coil) releases heat from the gaseous refrigerant as it condenses back into a liquid (e.g., releases heat to the air or water). In accordance with some embodiments, a reversing valve near the compressor is configured to selectively change the direction of the refrigerant flow to provide cooling as well as defrosting the outdoor coils in cold exterior temperatures. In some embodiments, the water pump circulates heated water into water tank to warm the water in the tank to a desired temperature.

In various embodiments, the efficiency and performance of the air-source heat pump is improved by implementing one or more of the following components:
- a vapor injection scroll compressor with an economized vapor compression cycle (e.g., offers more heat and better COP than with a conventional cycle);
- control circuitry configured to adaptively control fans, blowers, expansion valves, and/or compressor speed (e.g., by sensing thermal load to achieve optimal system performance and efficiency);
- electronic thermal expansion valves (e.g., for more precise control of the refrigerant flow of the system);
- variable speed fan and blowers (e.g., using electric motors);
- micro channel or small diameter copper grooved tubing coil designs; and
- variable speed motor driven rotary or scroll compressor.

As discussed previously, conventional RVs use three independent and distinct units to achieve the functions of air conditioning, heating, and hot water. The present disclosure includes embodiments integrating the three distinct units into a single unit (e.g., with an air source heat pump). Integrating the three distinct units reduces space requirements by reducing the number of components needed. Integrating the three distinct units also reduces installation time and effort and provide easier maintenance access by having components localized within a single unit. Finally, integrating the three distinct units also reduces weight by reducing the number of components needed, and increases energy efficiency by effective use of heat transfer, as described in detail below.

In one aspect, some embodiments include a method of conditioning air and heating water within a vehicle. In some embodiments, the method includes: (1) obtaining a desired temperature for an interior of the vehicle; (2) obtaining a desired temperature for water in a water storage of the vehicle; (3) determining a current temperature of the interior of the vehicle; (4) determining a current temperature of the water in the water storage; (5) in accordance with a determination that the current temperature of the water is below the desired temperature for the water, and a determination that the current temperature of the interior of the vehicle is below the desired temperature for the interior of the vehicle, operating a refrigerant system of the vehicle in a first mode to concurrently heat the water and heat the interior of the vehicle; and (6) in accordance with a determination that the current temperature of the water is below the desired temperature for the water, and a determination that the current temperature of the interior of the vehicle is above the desired temperature for the interior of the vehicle, operating the refrigerant system in a second mode to concurrently heat the water and cool the interior of the vehicle.

In another aspect, some embodiments include a system for providing heating, cooling, and hot water within a vehicle. In some embodiments the system includes: (1) a water storage tank configured to hold water; (2) a refrigeration system thermally-coupled to the water tank via a heat exchanger, the refrigeration system including: (a) a compressor configured to compressing a refrigerant; (b) a plurality of coils for thermally coupling the refrigerant to an interior of the vehicle and an exterior of the vehicle; (c) a plurality of valves configured to selectively enable refrigerant flow through respective coils of the plurality of coils and the heat exchanger; and (d) a plurality of refrigerant lines fluidly coupling the compressor, the plurality of coils, the heat exchanger, and the plurality of valves; and (3) a controller communicatively coupled to the plurality of valves and configured to operate the system in a plurality of modes, including: (i) a cooling and water mode for concurrently cooling the interior of the vehicle and heating water within the water tank; and (ii) a heating and water mode for concurrently heating the interior of the vehicle and heating water within the water tank.

In another aspect, some embodiments include a configured to perform any of the methods described herein. In another aspect, some embodiments include a non-transitory computer-readable storage medium storing one or more programs, the one or more programs comprising instructions which, when executed by a system, cause the system to perform any of the methods described herein.

Thus, systems and devices are provided with more efficient and effective methods for conditioning air and heating water within a vehicle, thereby increasing the effectiveness, efficiency, and user satisfaction with such systems and devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 1 is a block diagram illustrating a representative system in accordance with some embodiments.

DETAILED DESCRIPTION

The present disclosure describes various embodiments of integrated air conditioning and water heating systems. In some embodiments, an integrated system is self-contained. In some embodiments, an integrated system includes a self-contained air conditioning device coupled to a distinct water storage tank. For example, an RV includes a water storage tank for providing water to a vehicular shower and/or faucet. In this example, the RV also includes an air conditioning (e.g., an HVAC device) with a heat exchanger for transferring heat from a refrigerant of the air conditioning device to water in the water tank. In some embodiments, a user may specify a desired temperature for the water in the water tank and the integrated system will selectively transfer heat to the water to maintain it at the desired temperature. In some embodiments, the integrated system includes an enhanced vapor injection (EVI) loop to improve efficiency and effectiveness of the integrated system. In some embodiments, the integrated system includes a duct system with a vent sub-system to transfer conditioning air from the air conditioning device to the interior of the vehicle, and a recirculation sub-system to supply the air conditioning device with return air from the interior of the vehicle.

FIG. 1 is a block diagram illustrating a conditioning system 104 in accordance with some embodiments. FIG. 1 shows a vehicle 102 (e.g., a recreational vehicle (RV)) having an air conditioning and water heating system 104. In some embodiments, the system 104 includes a heating, ventilation, and air conditioning (HVAC) system. While FIG. 1 shows an over-the-road vehicle, those skilled in the art will recognize that the systems and methods described herein are applicable to other types of vehicles, such as watercraft, aircraft, and off-road vehicles.

Figure 2A:
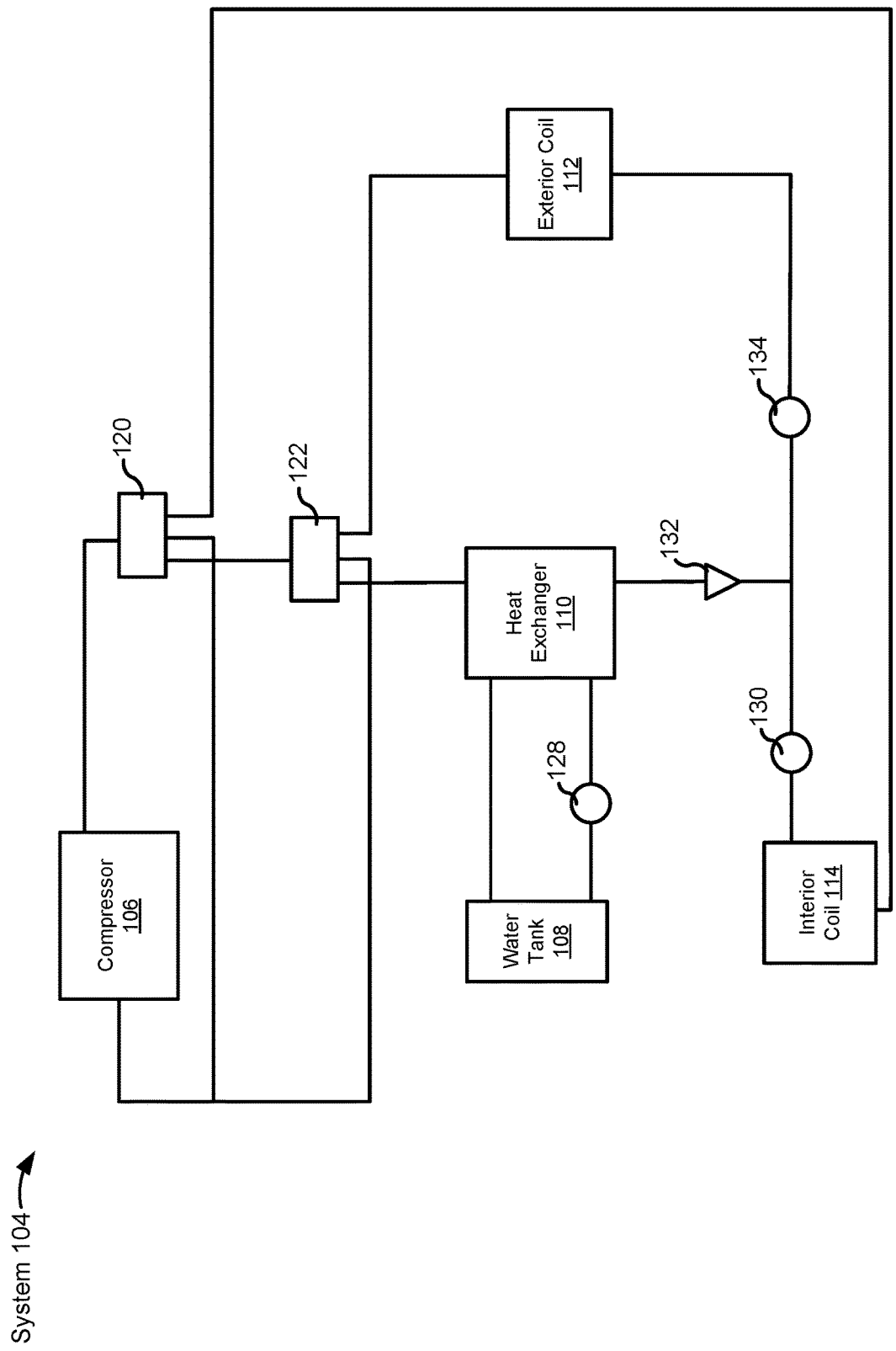
FIGS. 2A-2B are block diagrams illustrating representative systems in accordance with some embodiments.
Figure 2B:
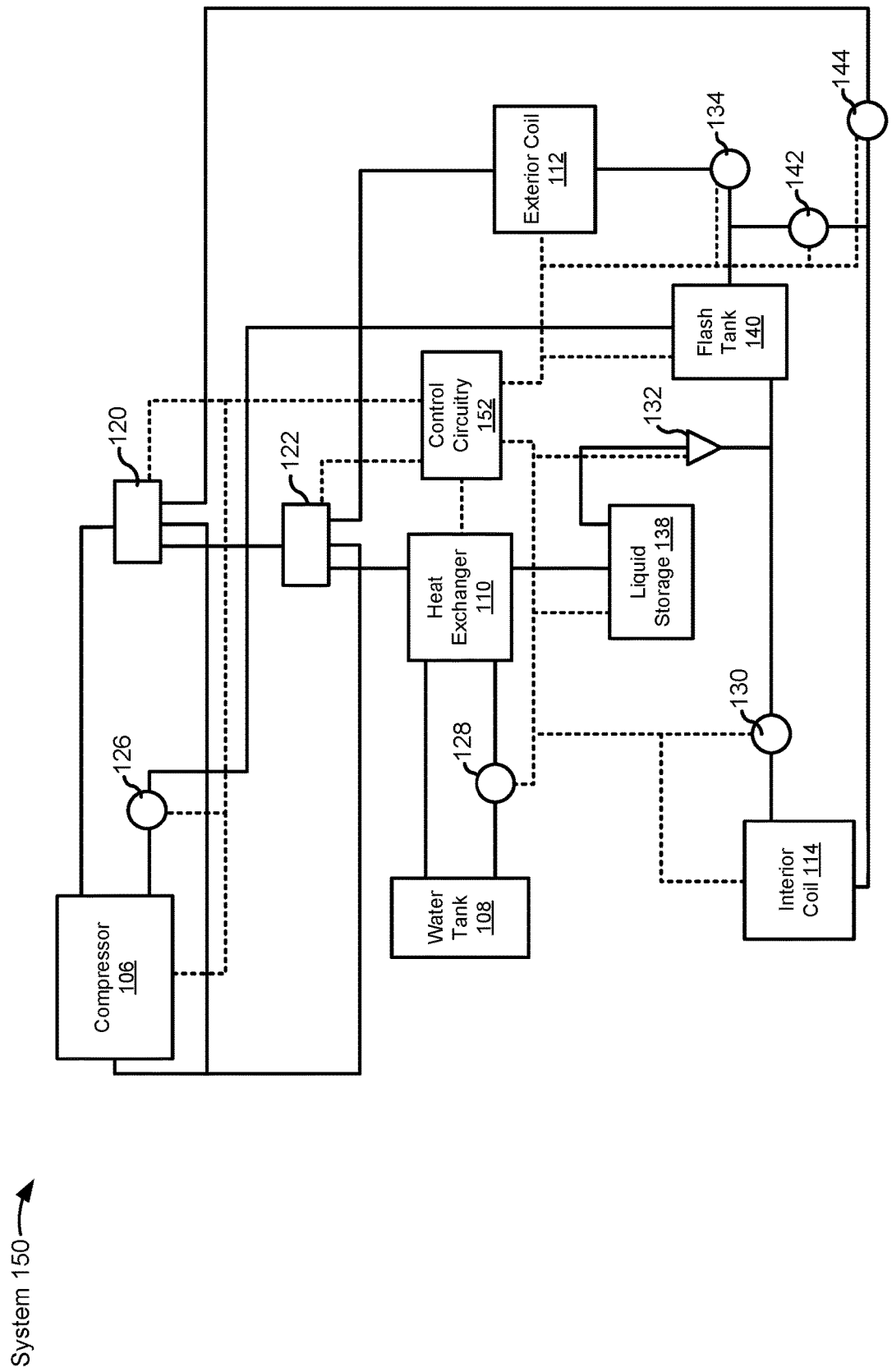

FIGS. 2A-2B are block diagrams illustrating representative conditioning systems in accordance with some embodiments. FIG. 2A shows the air and water system 104 of FIG. 1. In accordance with some embodiments, the system 104 includes a water tank 108 and a water pump 128 coupled to refrigeration system via a heat exchanger 110 (e.g., a refrigerant-to-liquid heat exchanger). In some embodiments, the refrigeration system includes a compressor 106, an interior coil 114 (e.g., a refrigerant-to-air heat exchanger), an exterior coil 112 (e.g., a refrigerant-to-air heat exchanger), four-way valves 120 and 122, valve 132, and metering devices 130 and 134. In some embodiments, the four-way valves 120 and 122 are replaced by one or more other valves (e.g., a three-way, five-way, or six-way valve). In some embodiments, the valve 132 is a check valve. In some embodiments, the metering devices 130 and 134 are expansion devices, such as electronic expansion valves (EEVs). In some embodiments, the exterior coil 112 is a condenser, or is configured to operate as a condenser, in some modes. In some embodiments, the interior coil 114 is an evaporator, or is configured to operate as an evaporator, in some modes. In some embodiments, the conditioning system 104 is self-contained. In some embodiments, the conditioning system 104 comprises (e.g., consists essentially of) a water tank 108 coupled to a self-contained refrigeration system. In some embodiments, the system 104 includes a plurality of compressors (e.g., coupled in parallel). In some embodiments, the plurality of compressors includes an electrically-driven compressor, and, optionally, an engine-driven compressor coupled to the vehicle's engine.

In various embodiments, the conditioning system 104 includes one or more additional components not shown in FIG. 2A, such as blower fans, control circuitry, an EVI loop, a user interface, air filters, refrigerant storage, and the like. In some embodiments, the air-conditioning system includes at least one user interface (e.g., a touch screen) and at least one sensor (e.g., a thermostat). In some embodiments, the conditioning system 104 includes at least one battery or power source and a battery monitoring system (also sometimes called a battery management system). In some embodiments, the battery monitoring system includes at least one current sensor. In some embodiments, the battery monitoring system includes a controller, such as an automatic temperature controller. In some embodiments, the controller is electrically coupled to other components of the system 104 (e.g., a compressor, a condenser, etc.) to control operation of these components.

FIG. 2B shows an air conditioning and water heating system 150 in accordance with some embodiments. The air and water system 150 includes the water tank 108 and the water pump 128 thermally coupled to a refrigeration system via the heat exchanger 110. The refrigeration system includes the compressor 106, the interior coil 114, and the exterior coil 112. The refrigeration system also includes the four-way valves 120 and 122, valves 126, 132, 142, and 144, and metering devices 130 and 134. In some embodiments, one or more of valves 126, 132, and 144 are solenoid valves. In some embodiments, one or more of metering devices 130 and 134 are expansion valves, such as thermal expansion devices. In some embodiments, valve 132 is a check valve. The refrigeration system further includes a liquid storage 138 (e.g., a receiver) and a flash tank 140. In some embodiments, the system 150 includes control circuitry 152 communicatively coupled to other components of the system 150. In some embodiments, the control circuitry 152 includes one or more controllers or processors. In some embodiments, the control circuitry 152 governs operation of the four-way valves 120 and 122 (e.g., adjusts configuration of the four-way valves). In some embodiments, the control circuitry 152 governs operation of the compressor 106 and the water pump 128 (e.g., adjusts operating speed of the compressor). In some embodiments, the control circuitry 152 selectively opens and closes various valves and devices (e.g., valves 132, 142, and 144, and/or devices 130 and 134). In some embodiments, the control circuitry 150 is configured to govern speed of the compressor 106 and/or coil fans (e.g., based on a thermal load of the conditioning system).

In some embodiments, the compressor 106 is a vapor injection scroll compressor. In some embodiments, the compressor 106 is variable speed compressor. In some embodiments, the system includes an electric power source for powering the compressor 106, the water pump 128, the control circuitry 152, and/or coil fans. In some embodiments, the system is configured to operate independent of the operating state of the vehicle (e.g., does not require the vehicle's engine to be on). In some embodiments, the system 150 includes a plurality of compressors (e.g., coupled in parallel). In some embodiments, the plurality of compressors includes an electrically-driven compressor, and, optionally, an engine-driven compressor coupled to the vehicle's engine.

FIGS. 3A-3E illustrate representative operating modes for the conditioning system of FIG. 2B in accordance with some embodiments. In FIGS. 3A-3E, the wider, short arrows 302 indicate flow of refrigerant in a first temperature range (e.g., hot or vapor refrigerant); the narrower, short arrows 304 indicate flow of refrigerant in a second temperature range (e.g., cool or liquid refrigerant), where the second temperature range is lower than the first temperature range; and the longer arrows 306 indicate flow of vapor refrigerant from the flash tank 140 to the compressor 106 (e.g., as part of an EVI loop).

Figure 3A:
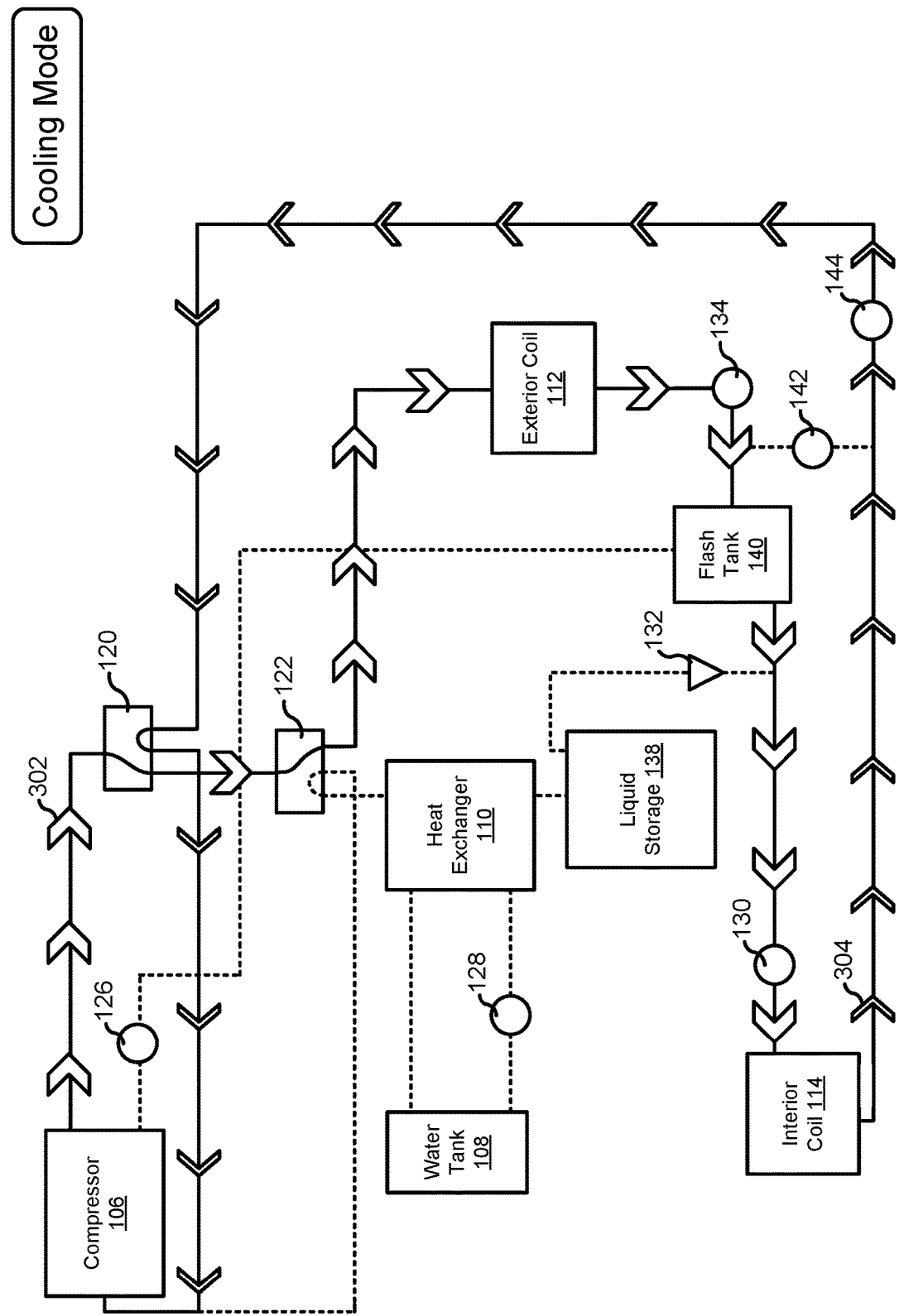
FIGS. 3A-3E illustrate representative operating modes for the system of FIG. 2B in accordance with some embodiments.

FIG. 3A shows a cooling mode for the system 150 in accordance with some embodiments. In the cooling mode illustrated in FIG. 3A: (1) the four-way valve 120 and the four-way valve 122 fluidly couple an outlet of the compressor 106 to the exterior coil 112; (2) the four-way valve 120 fluidly couples the interior coil 114 to an inlet of the compressor 106; and (3) the four-way valve 122 couples the heat exchanger 110 to the inlet of the compressor 106 (though no refrigerant is flowing). In accordance with some embodiments, in the cooling mode, the valves 126, 132, and 142 are closed. In accordance with some embodiments, in the cooling mode, the water pump 128 is disabled. In accordance with some embodiments, in the cooling mode, heat is transferred from the refrigerant to an exterior of the vehicle via the exterior coil 112, and heat is transferred from the interior of the vehicle to the refrigerant via the interior coil 114.

Figure 3B:
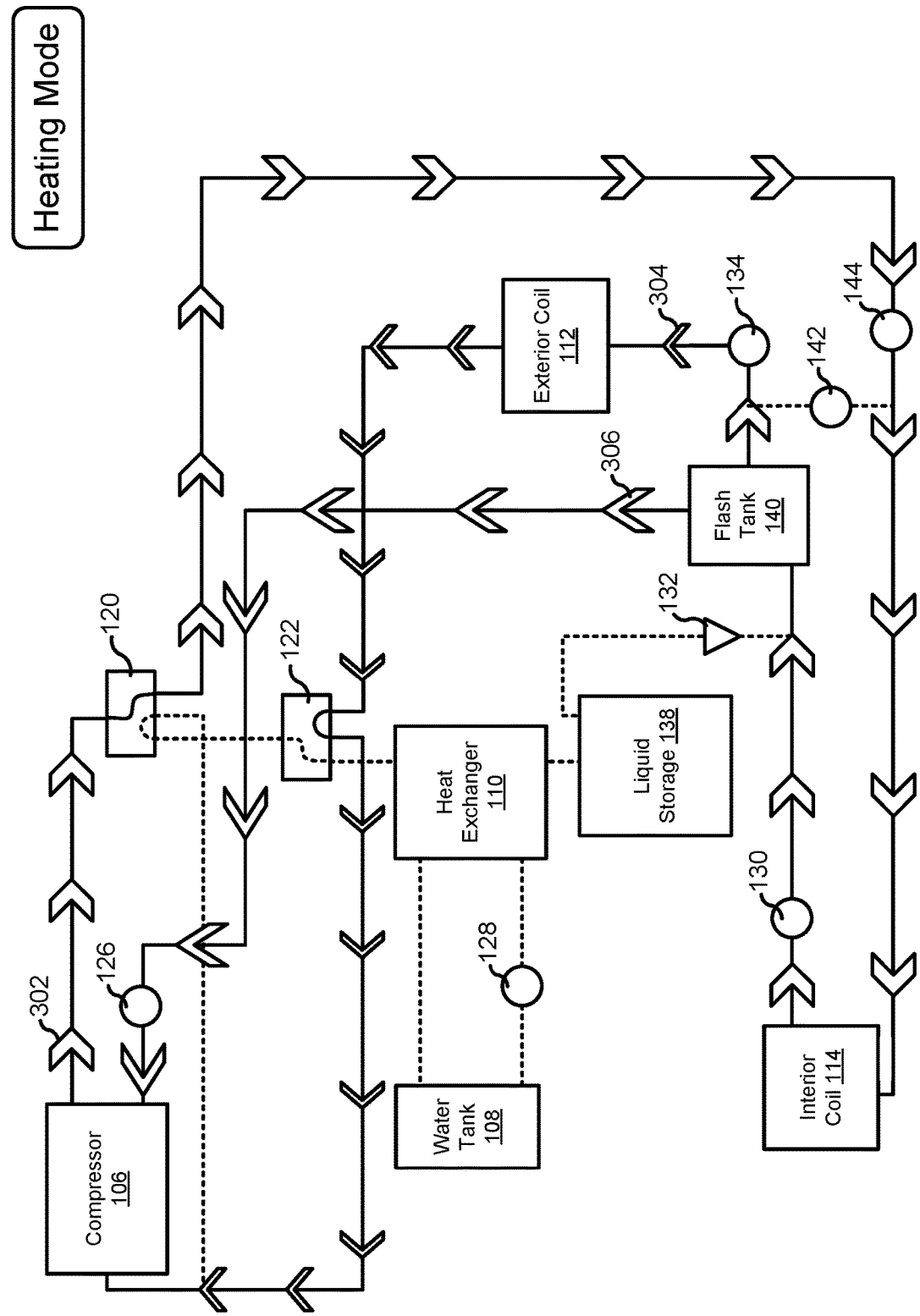

FIG. 3B shows a heating mode for the system 150 in accordance with some embodiments. In the heating mode illustrated in FIG. 3B: (1) the four-way valve 120 fluidly couples an outlet of the compressor 106 to the interior coil 114; (2) the four-way valve 122 fluidly couples the exterior coil 12 to an inlet of the compressor 106; and (3) the four-way valves 120 and 122 couple the heat exchanger 110 to the inlet of the compressor 106 (though no refrigerant is flowing). In accordance with some embodiments, in the heating mode, the valves 132 and 142 are closed. In accordance with some embodiments, in the heating mode, the water pump 128 is disabled. In accordance with some embodiments, in the heating mode, heat is transferred from the refrigerant to an interior of the vehicle via the interior coil 114.

Figure 3C:
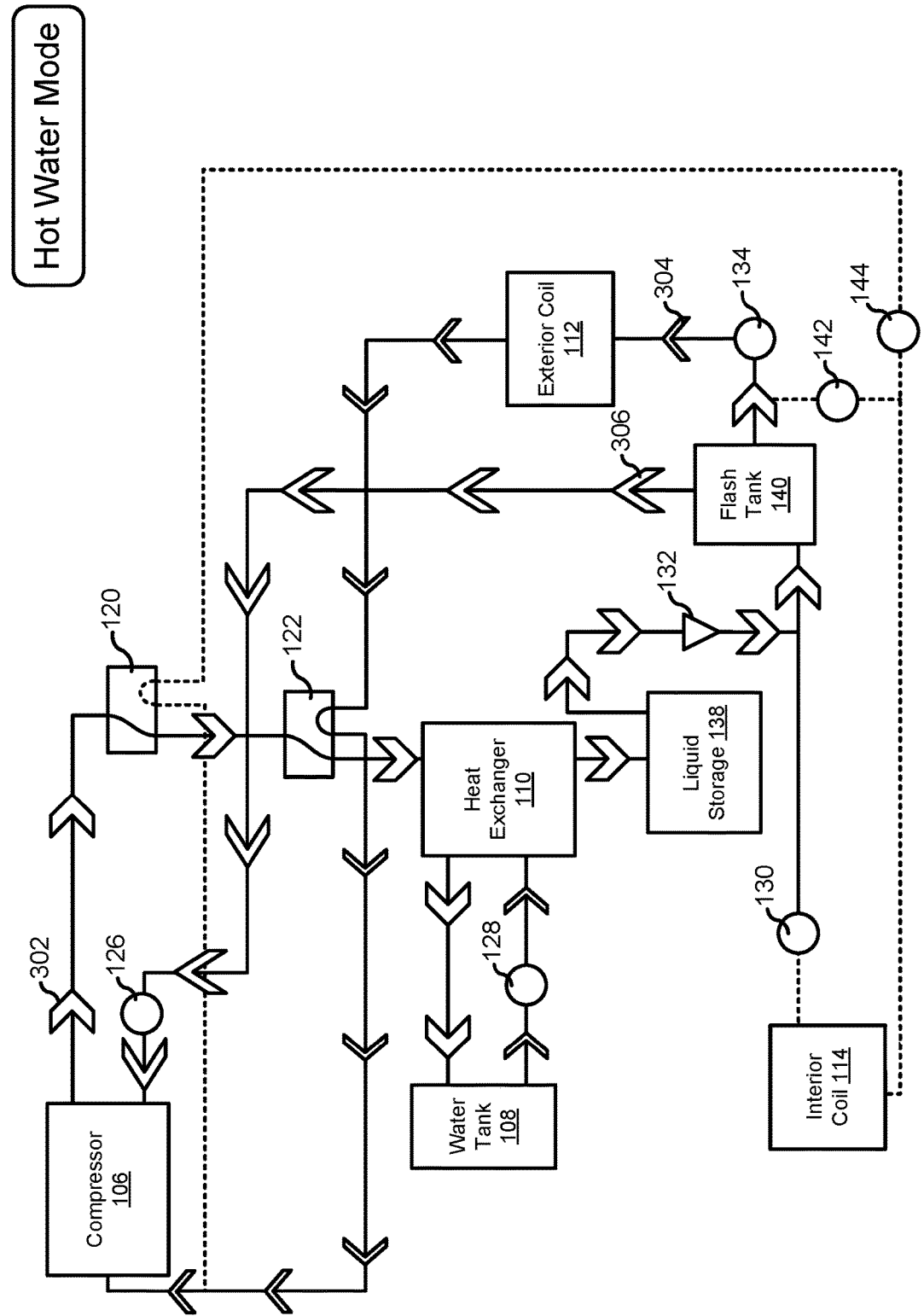

FIG. 3C shows a hot water mode for the system 150 in accordance with some embodiments. In the hot water mode illustrated in FIG. 3C: (1) the four-way valves 120 and 122 fluidly couple an outlet of the compressor 106 to the heat exchanger 110; (2) the four-way valve 122 fluidly couples the exterior coil 112 to an inlet of the compressor 106; and (3) the four-way valve 120 couples the interior coil 114 to the inlet of the compressor 106 (though no refrigerant is flowing). In accordance with some embodiments, in the hot water mode, the valves 142 and 144 are closed and the metering device 130 is closed. In accordance with some embodiments, in the hot water mode, the water pump 128 is enabled. In accordance with some embodiments, in the hot water mode, heat is transferred from the refrigerant to the water in the water tank 108 via the heat exchanger 110.

Figure 3D:
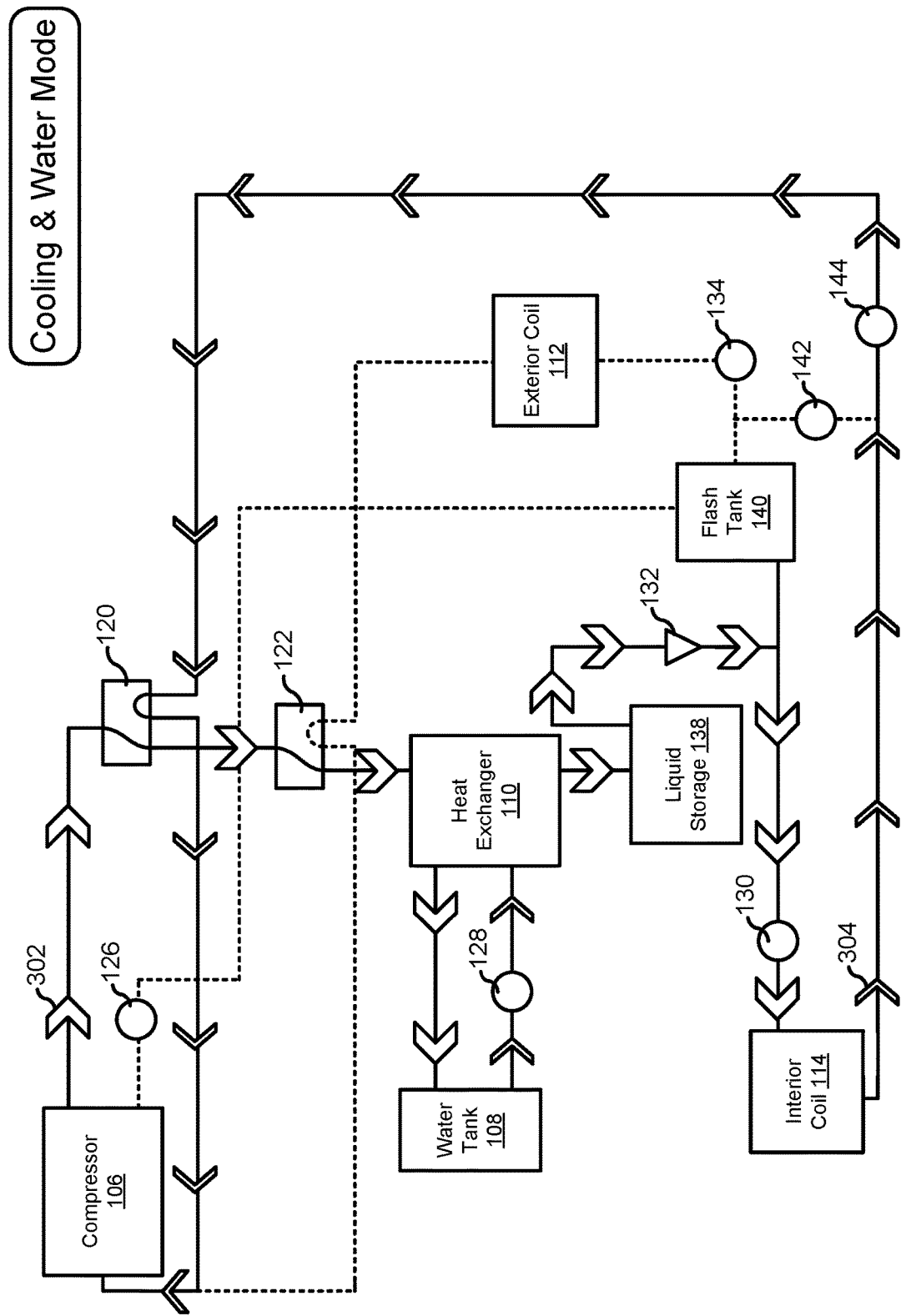

FIG. 3D shows a cooling and hot water mode for the system 150 in accordance with some embodiments. In the cooling and hot water mode illustrated in FIG. 3D: (1) the four-way valves 120 and 122 fluidly couple an outlet of the compressor 106 to the heat exchanger 110; (2) the four-way valve 120 fluidly couples the interior coil 112 to an inlet of the compressor 106; and (3) the four-way valve 122 couples the exterior coil 112 to the inlet of the compressor 106 (though no refrigerant is flowing). In accordance with some embodiments, in the cooling and hot water mode, the valves 126 and 142 are closed and the device 134 is closed. In accordance with some embodiments, in the cooling and hot water mode, the water pump 128 is enabled. In accordance with some embodiments, in the cooling and hot water mode, heat is transferred from the refrigerant to the water in the water tank 108 via the heat exchanger 110, and heat is transferred from an interior of the vehicle to the refrigerant via the interior coil 114.

Figure 3E:
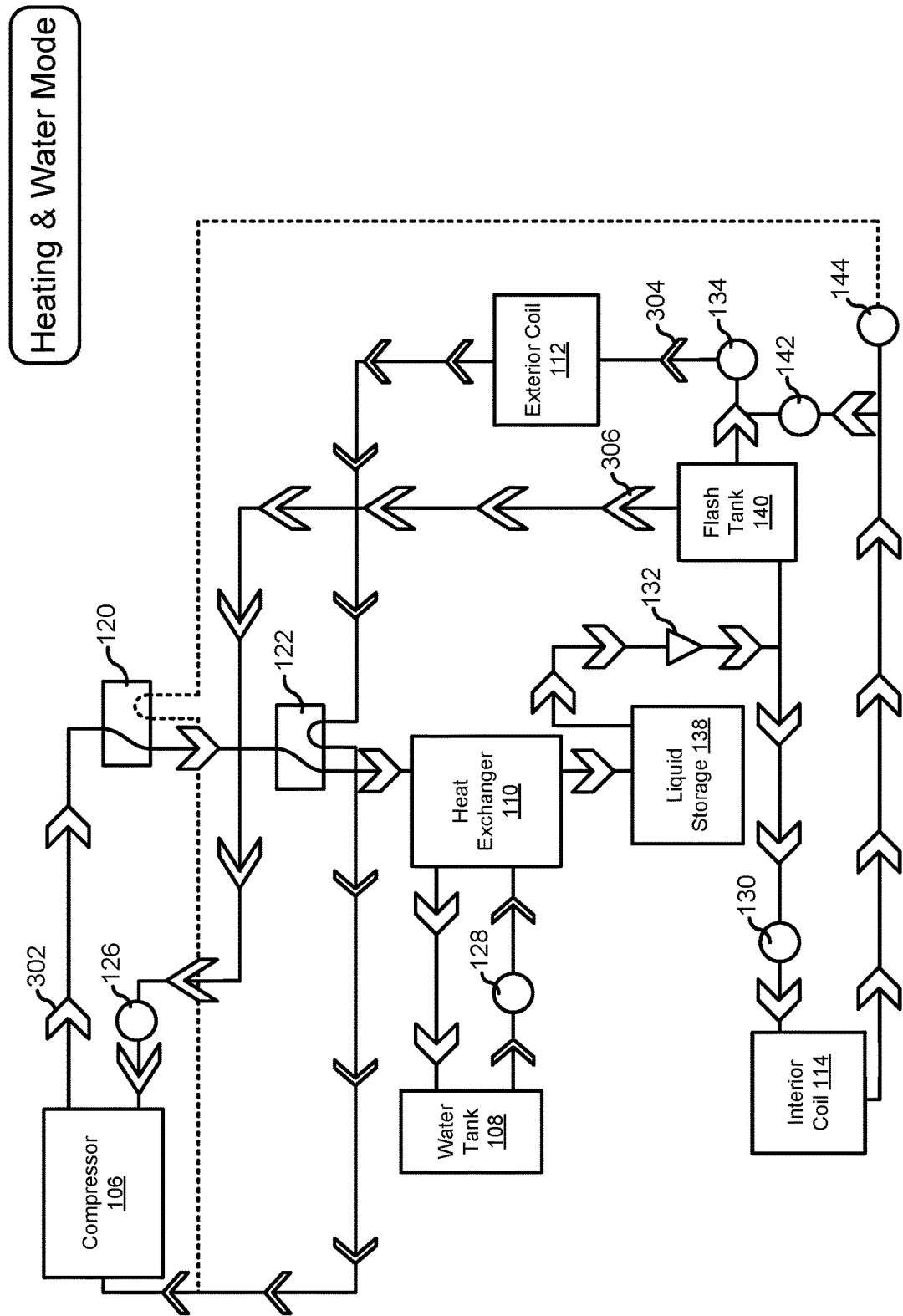

FIG. 3E shows a heating and hot water mode for the system 150 in accordance with some embodiments. In the heating and hot water mode illustrated in FIG. 3E: (1) the four-way valves 120 and 122 fluidly couple an outlet of the compressor 106 to the heat exchanger 110; (2) the four-way valve 122 fluidly couples the exterior coil 112 to an inlet of the compressor 106; and (3) the four-way valve 120 couples the interior coil 114 to the inlet of the compressor 106 (though no refrigerant is flowing). In accordance with some embodiments, in the heating and hot water mode, the valve 144 is closed. In accordance with some embodiments, in the heating and hot water mode, the water pump 128 is enabled. In accordance with some embodiments, in the heating and hot water mode, heat is transferred from the refrigerant to the water in the water tank 108 via the heat exchanger 110, heat is transferred from the refrigerant to an interior of the vehicle via the interior coil 114, and heat is transferred from an exterior of the vehicle to the refrigerant via the exterior coil 112.

Figure 4A:
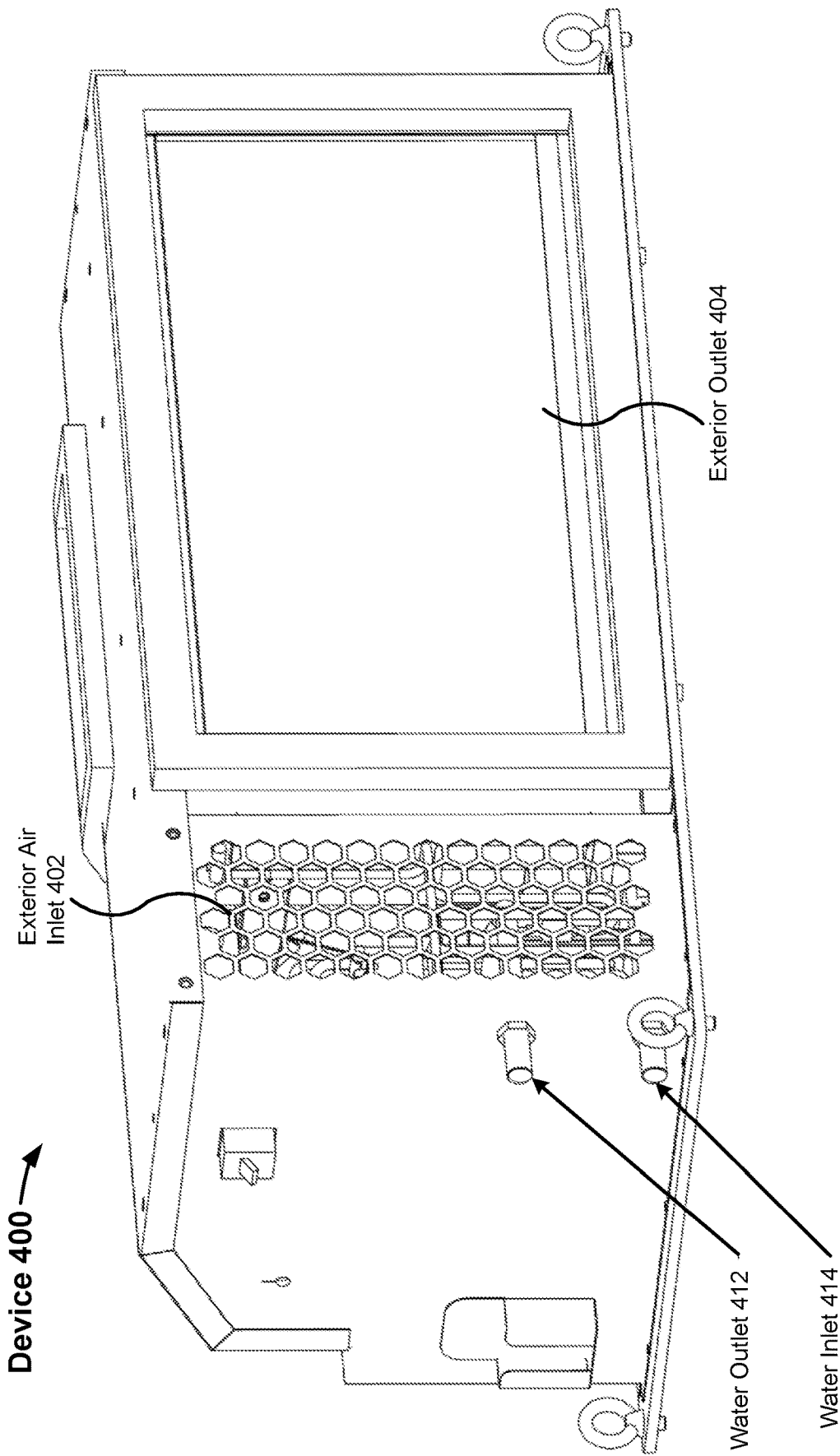
FIGS. 4A-4B are perspective views illustrating a representative device in accordance with some embodiments.
Figure 4B:
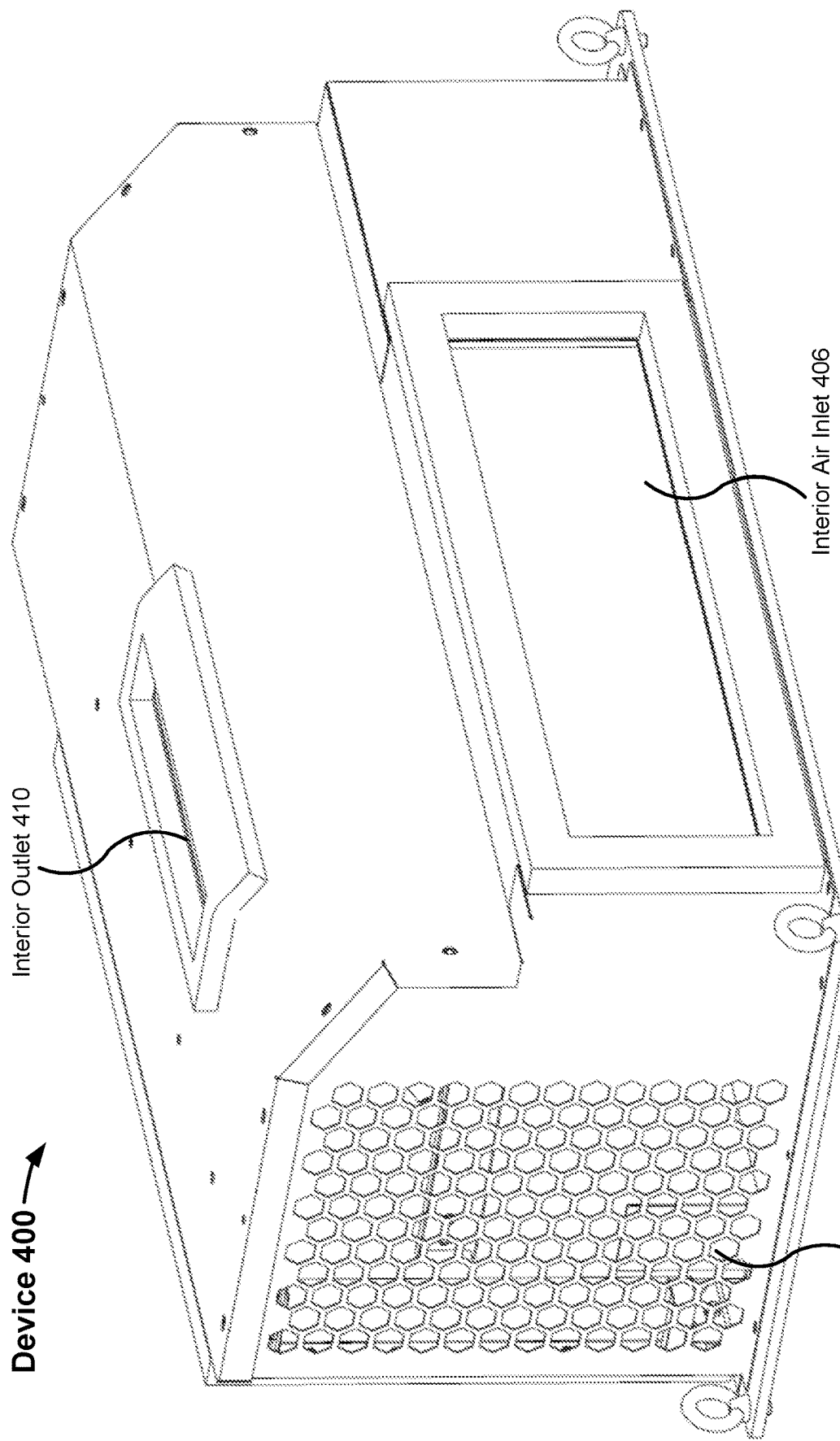

FIGS. 4A-4B are perspective views illustrating a conditioning device 400 in accordance with some embodiments.

In some embodiments, the system 104 (or the system 150) includes the conditioning device 400 and a water tank 108 fluidly coupled via a water outlet 412 and a water inlet 414. The conditioning device 400 includes exterior air inlets 402 and 408, and an exterior outlet 404 in accordance with some embodiments. The conditioning device 400 includes an interior air inlet 406 and an interior outlet 410 in accordance with some embodiments.

Figure 5A:
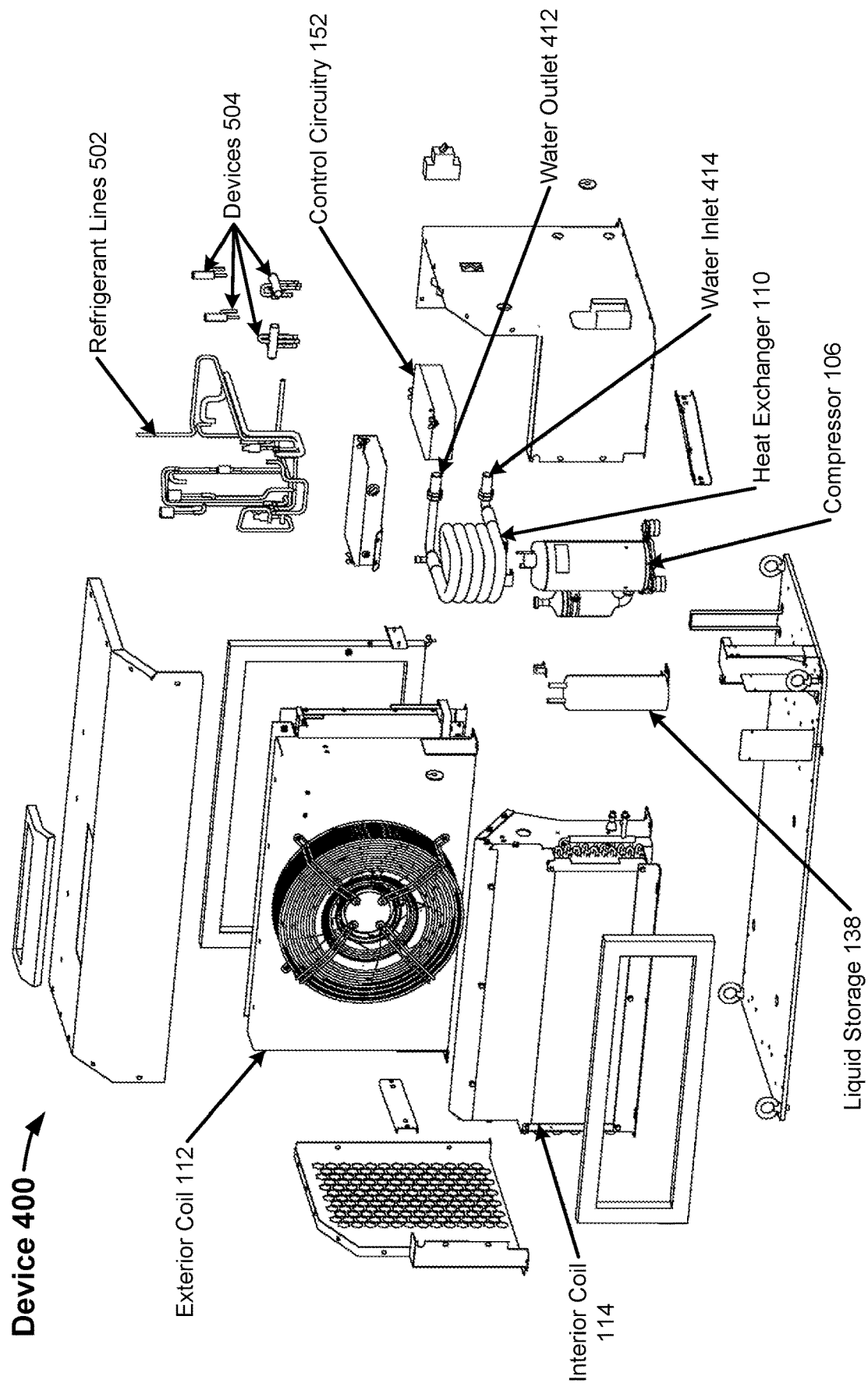
FIGS. 5A-5B are exploded views illustrating the device of FIGS. 4A-4B in accordance with some embodiments.
Figure 5B:
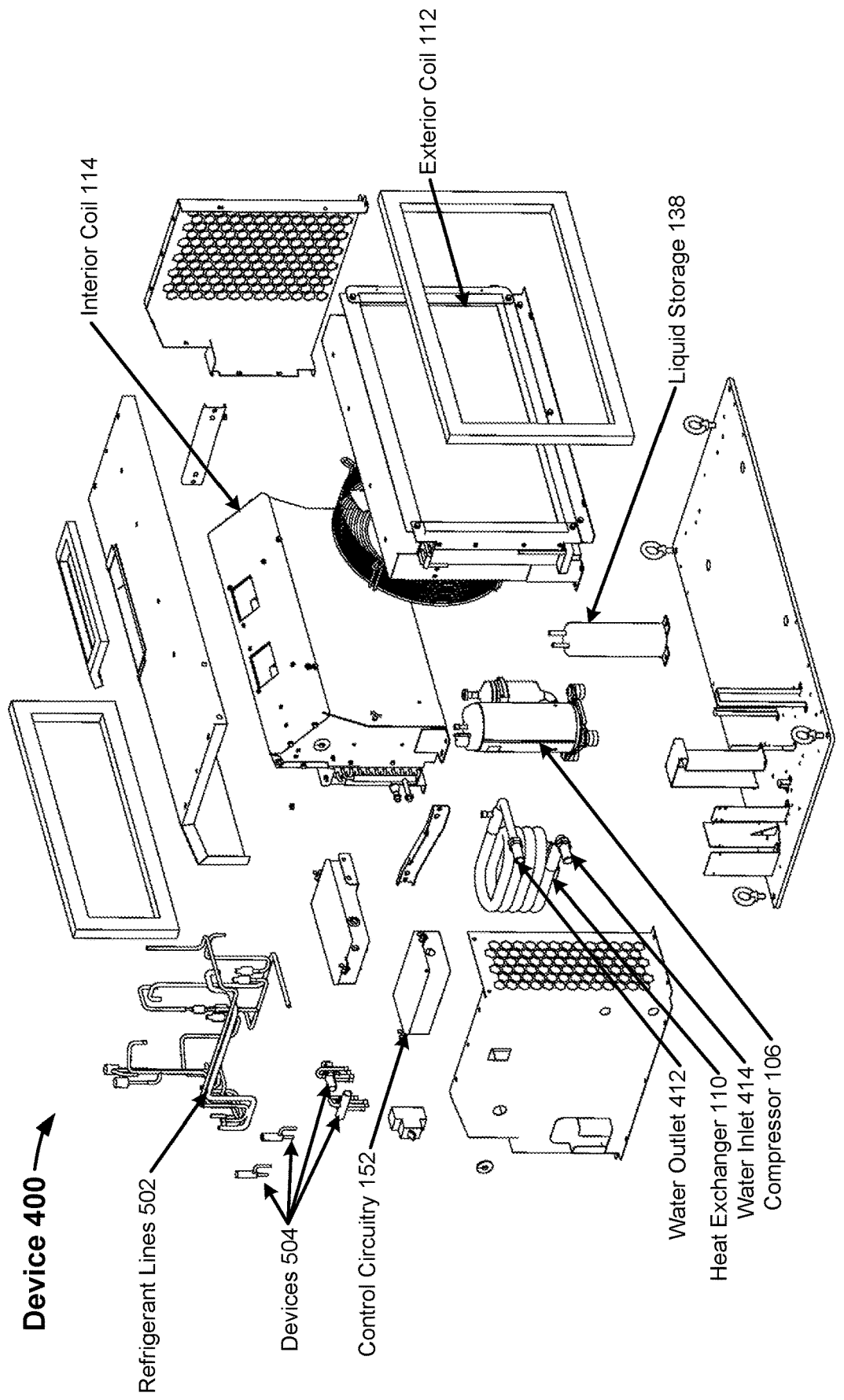

FIGS. 5A-5B are exploded views illustrating the conditioning device 400 in accordance with some embodiments. As shown in FIGS. 5A-5B, the device 400 includes an assembly with the exterior coil 112, an assembly with the interior coil 114, the compressor 106, the heat exchanger 110 (with water inlet 414 and water outlet 412), the liquid storage 138, and the control circuitry 152 in accordance with some embodiments. The device further includes refrigerant lines 502 and devices 504 (e.g., four-way valves 120 and 122 and metering devices 130 and 134) in accordance with some embodiments. In some embodiments, the device 400 includes one or more additional components, such as the flash tank 140, the water pump 128, one or more fans (e.g., coupled to the exterior coil 112 and/or the interior coil 114), one or more sensors (e.g., temperature sensors, pressure sensors, current sensors, and/or voltage sensors), and a user interface (e.g., one or more buttons, touch screens, or affordances).

Figure 6:
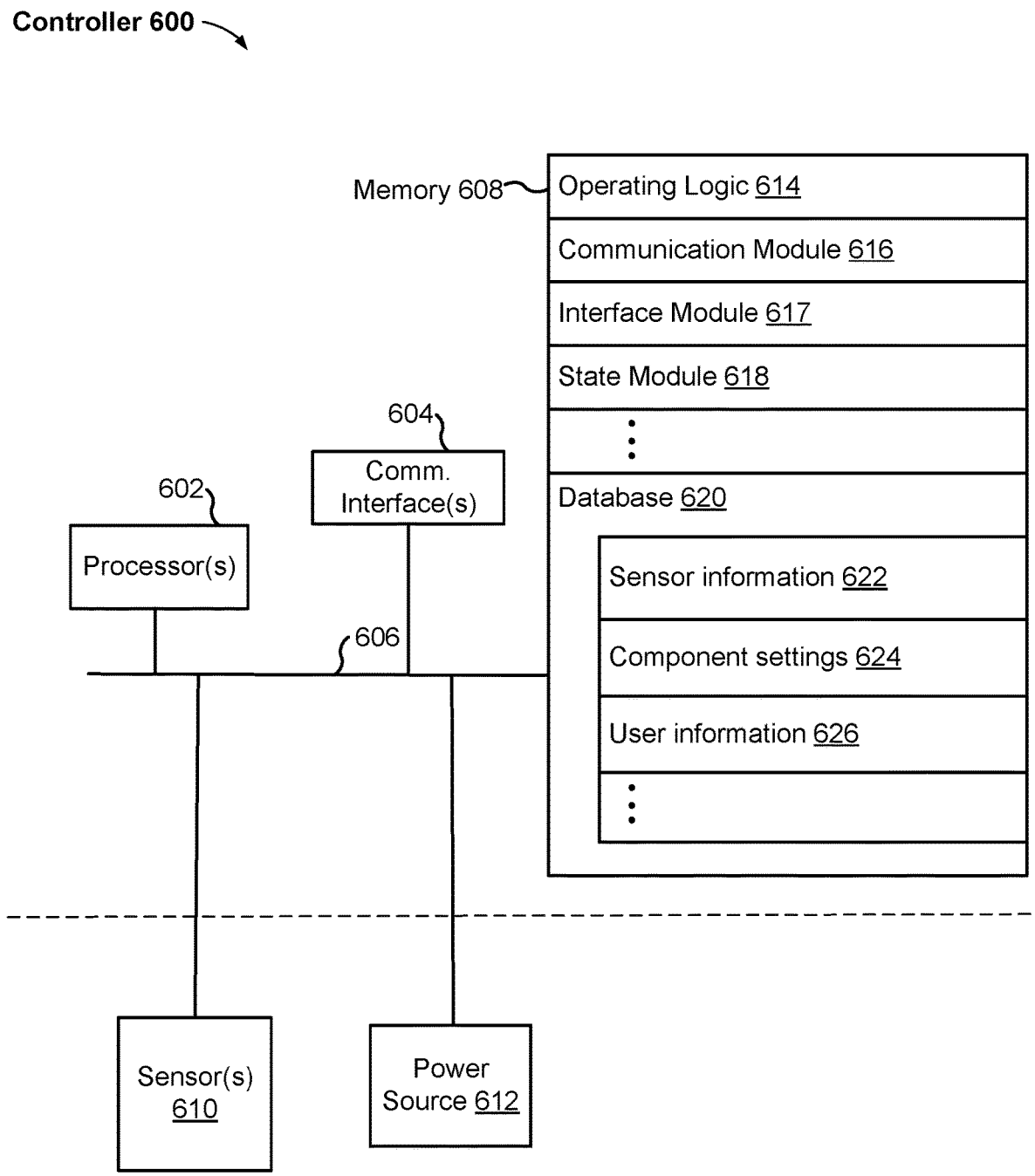
FIG. 6 is a block diagram illustrating representative controller in accordance with some embodiments.
Figure 7A:
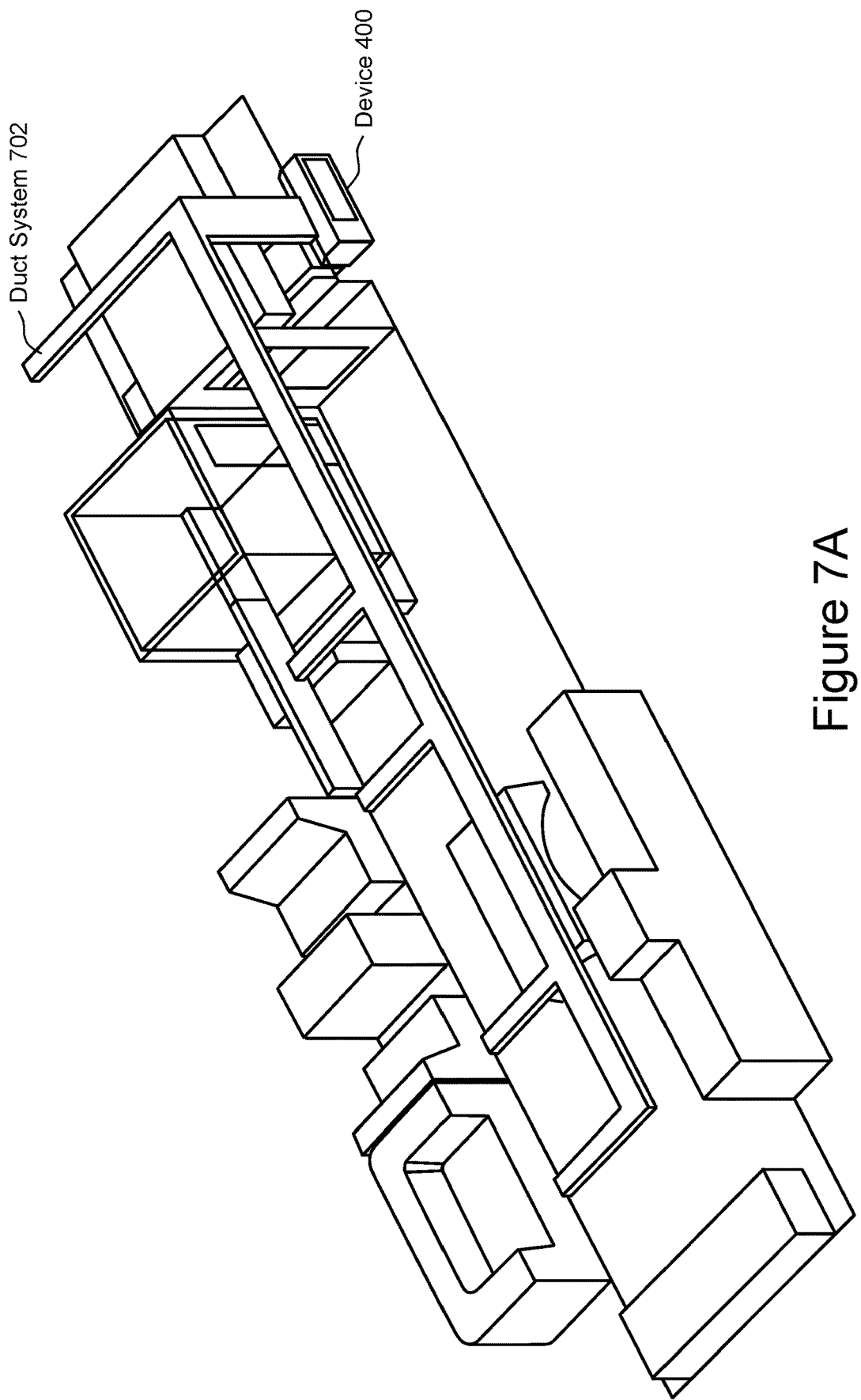
FIGS. 7A-7D are perspectives views illustrating a representative duct system in accordance with some embodiments.
Figure 7B:
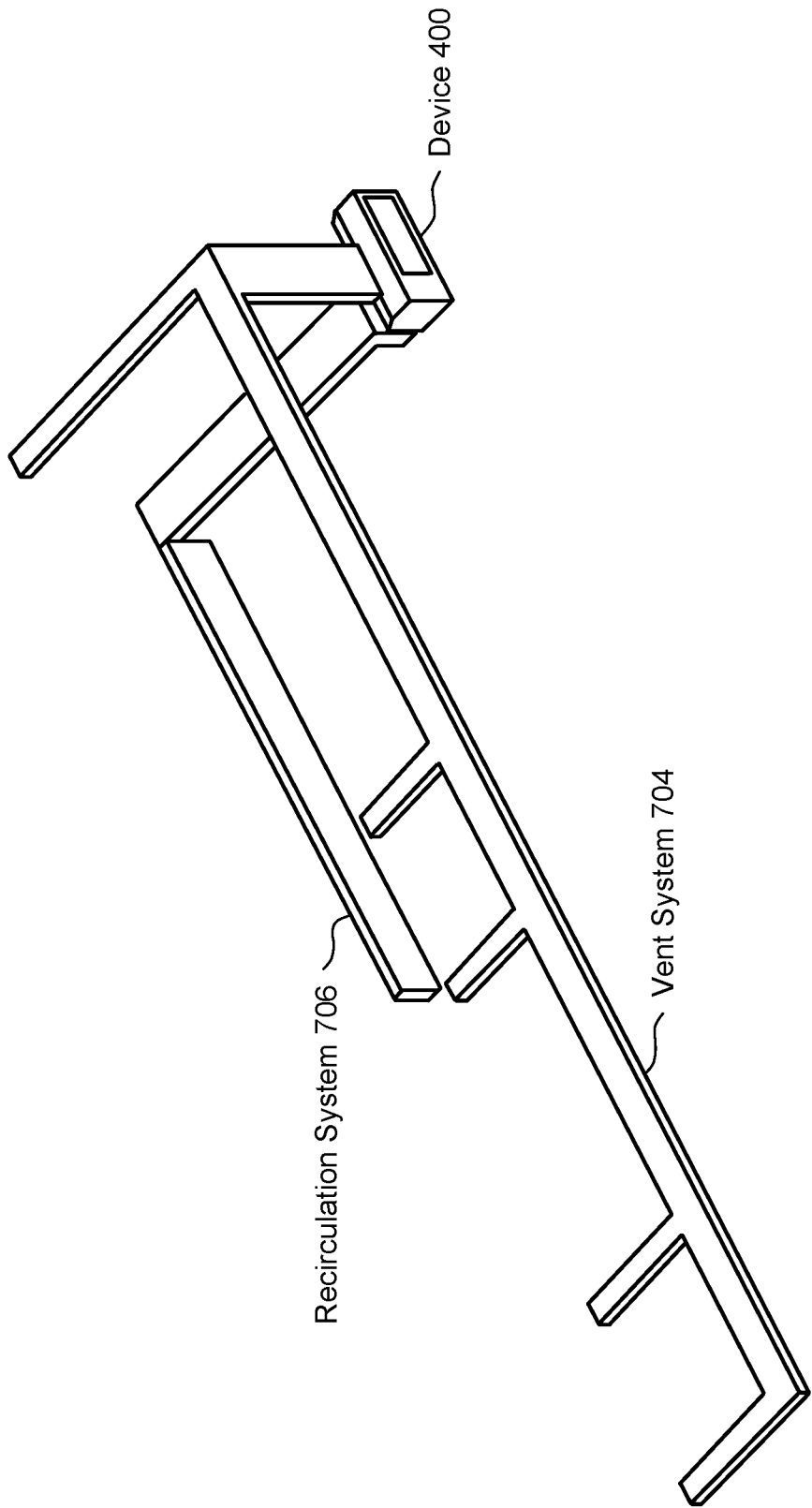
Figure 7C:
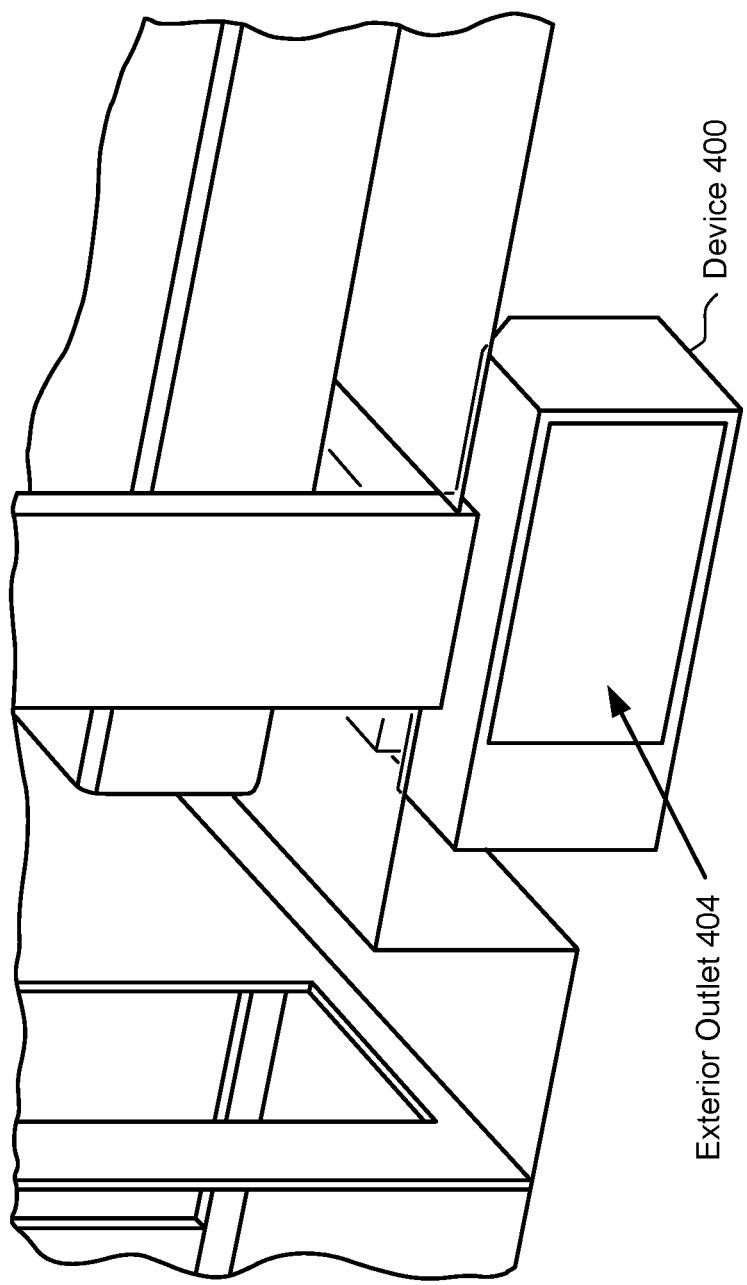
Figure 7D:
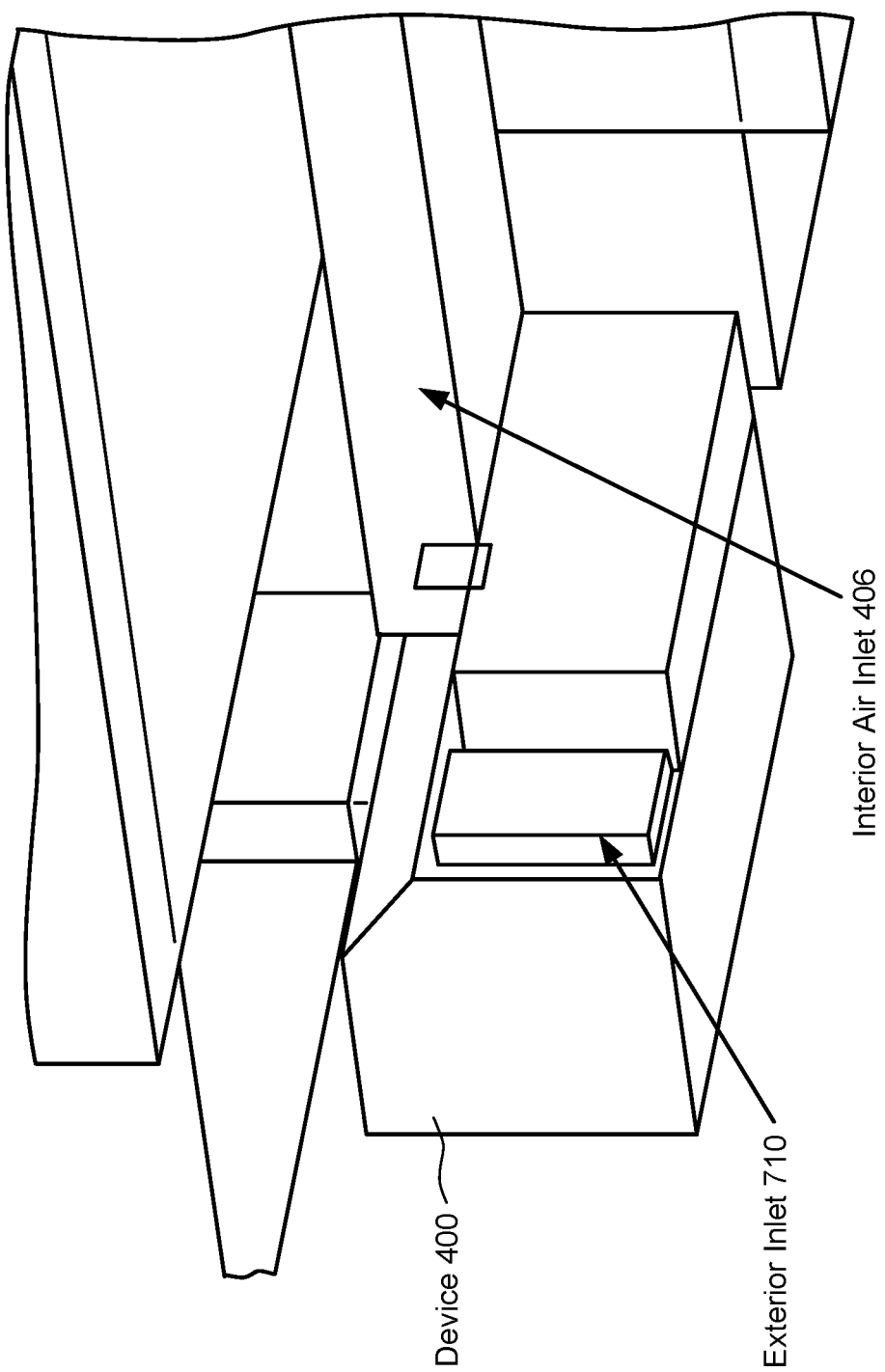

FIG. 6 is a block diagram illustrating controller 600 in accordance with some embodiments. In some embodiments, the controller 600 is, or includes, the control circuitry 152. In some embodiments, the control circuitry 152 includes the controller 600. In some embodiments, the controller 600 includes one or more processors 602, one or more communication interfaces 604, memory 608, and one or more communication buses 606 for interconnecting these components (sometimes called a chipset). In accordance with some embodiments, the controller 600 is coupled to one or more sensors 610 (e.g., temperature sensors) and a power source 612 (e.g., a battery or electrically-driven motor). In some embodiments, the memory 608 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 608, optionally, includes one or more storage devices remotely located from the one or more processors 602. The memory 608, or alternatively the non-volatile memory within the memory 608, includes a non-transitory computer readable storage medium. In some embodiments, the memory 608, or the non-transitory computer readable storage medium of the memory 608, stores the following programs, modules, and data structures, or a subset or superset thereof:
- operating logic 614 including procedures for handling various basic system services and for performing hardware dependent tasks;
- communication module 616 for communicatively-connecting the controller 600 to other computing devices (e.g., vehicular control system or client device) via one or more networks (e.g., the Internet);
- interface module 617 for presenting information to a user and detecting user input(s) (e.g., in conjunction with communication interface(s) 604);
- state module 618 for setting and/or adjusting an operating state of the conditioning system; and database 620 storing data for use in governing operation of a conditioning system (e.g., the conditioning system 150), including but not limited to:
- sensor information 622 storing information regarding one or more sensors associated with the conditioning system (e.g., temperature data, pressure data, and/or current data);
- component settings 622 storing information regarding one or more components of the conditioning system (e.g., operational settings, such as speed and power); and
- user information 626 storing information regarding user preferences, settings, history, etc.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 608, optionally, stores a subset of the modules and data structures identified above. Furthermore, the memory 608, optionally, stores additional modules and data structures not described above, such as a vehicle module for interfacing between the vehicle and the conditioning system.

FIGS. 7A-7D are perspectives views illustrating a duct system 702 in accordance with some embodiments. The duct system 702 is coupled to the conditioning device 400, e.g., via the interior outlet 410 and the interior air inlet 406. In some embodiments, the exterior inlet 710 is, or includes, the exterior air inlet 408. In some embodiments, the device 400 is positioned on the vehicle such that the exterior inlet 710 is under the vehicle. In accordance with some embodiments, the duct system 702 includes a vent system 704 (e.g., positioned along a roof of the vehicle) and a recirculation system 706 (e.g., positioned along a floor of the vehicle). In some embodiments, the recirculation system 706 is coupled to the device via the interior inlet 406. In some embodiments, the vent system 704 is coupled to the device via the interior outlet 410.

Figure 8A:
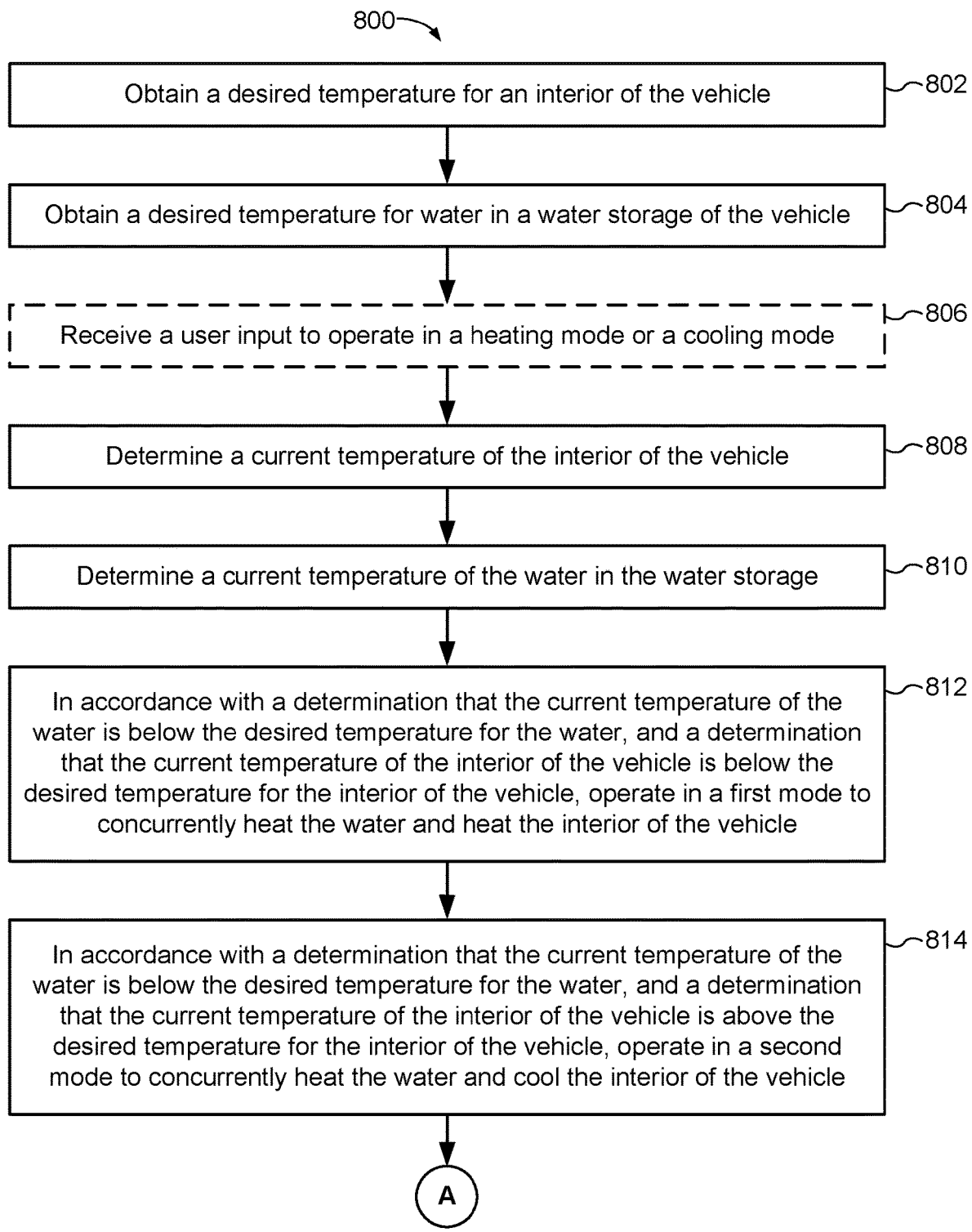
FIGS. 8A-8B are flow diagrams illustrating a representative method of conditioning air and heating water in a vehicle in accordance with some embodiments.
Figure 8B:
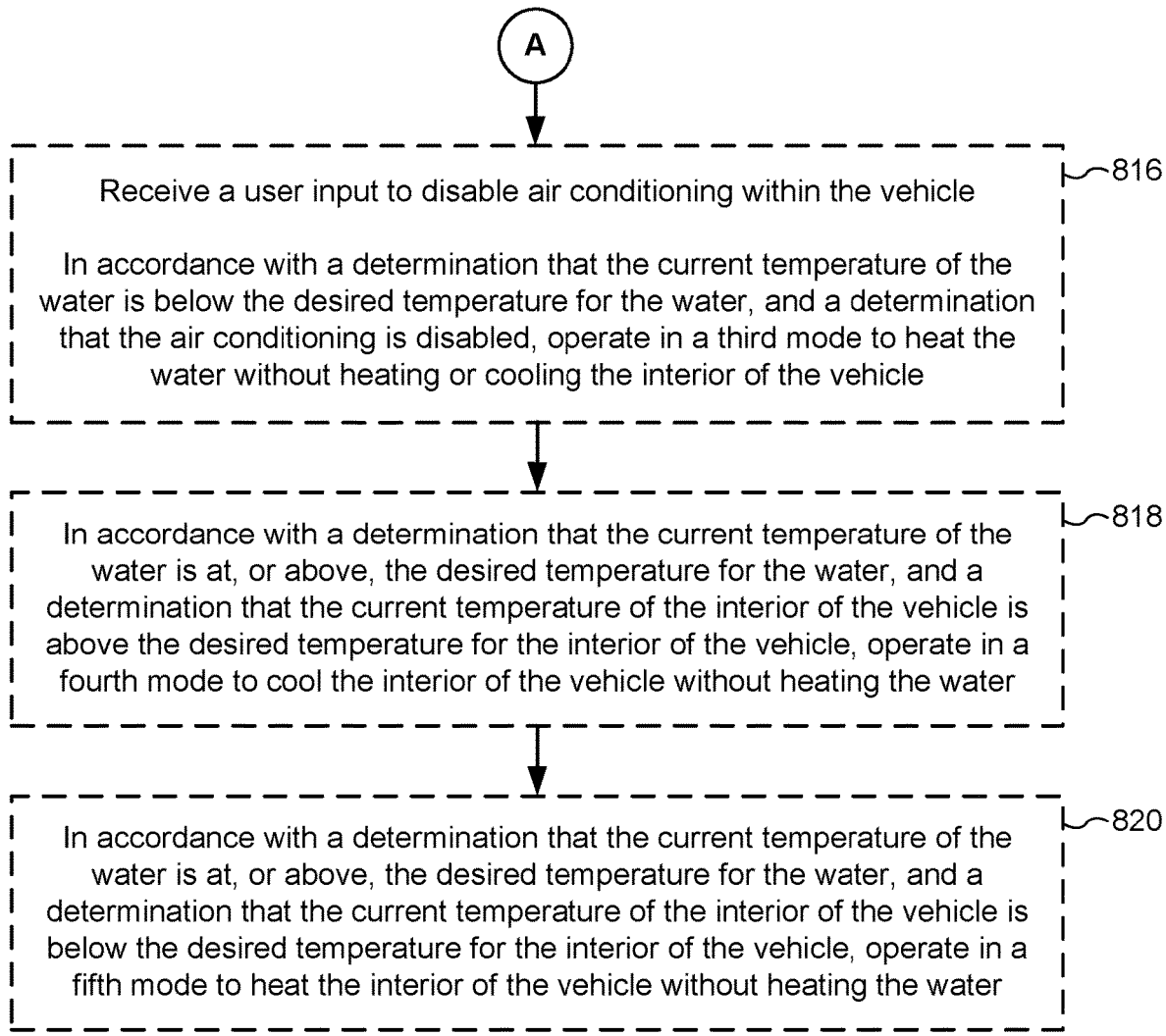

FIGS. 8A-8B are flow diagrams illustrating a method 800 of conditioning air and heating water in a vehicle in accordance with some embodiments. In some embodiments, the method 800 is performed by a conditioning system (e.g., the system 104), or a component of the system, such as the control circuitry 152 and/or the controller 600. In some implementations, the method 800 is governed by instructions that are stored in a non-transitory computer-readable storage medium (e.g., the memory 608) and the instructions are executed by one or more processors of the electronic device (e.g., the processors 602). For convenience, the method 800 is described below as being performed by an air conditioning and water heating system.

The air conditioning and water heating system obtains (802) a desired temperature for an interior of the vehicle. The conditioning system obtains (804) a desired temperature for water in a water storage (e.g., water tank 108) of the vehicle. In some embodiments, the desired temperatures are received from an occupant of the vehicle. In some embodiments, the desired temperatures are received via a user interface of the vehicle or the conditioning system. In some embodiments, the desired temperatures are received via an application executing on a user device (e.g., a cell phone). The system optionally obtains the desired temperature for the water before, after, or at the same time as obtaining the desired temperature for the interior of the vehicle.

In some embodiments, the air conditioning and water heating system receives (806) a user input to operate in a heating mode or a cooling mode. For example, the user selects a cooling mode, a heating mode, or neither. In some embodiments, the user input is received via a user interface of the vehicle or the conditioning system. In various embodiments, the user input is received before, after, or in conjunction with, obtaining the desired temperature for the interior of the vehicle.

The air conditioning and water heating system determines (808) a current temperature of the interior of the vehicle. In some embodiments, the system includes a temperature sensor thermally coupled to an interior of the vehicle (e.g., a sensor 610, FIG. 6). In some embodiments, the system is communicatively coupled to a temperature sensor distinct from the system.

The air conditioning and water heating system determines (810) a current temperature of the water in the water storage tank. In some embodiments, the conditioning system includes a temperature sensor thermally coupled to the water storage tank (e.g., a sensor 610, FIG. 6). In some embodiments, the system is communicatively coupled to a temperature sensor distinct from the system. In some embodiments, the temperature sensor is mounted on the water storage (e.g., on the water tank 108, FIG. 1). In some embodiments, the temperature sensor is coupled to one or more water lines or components external to the water storage (e.g., the water pump 128, FIG. 1). The system optionally obtains the desired temperatures before, after, or in conjunction with, determining the current temperatures.

In accordance with a determination that the current temperature of the water is below the desired temperature for the water, and a determination that the current temperature of the interior of the vehicle is below the desired temperature for the interior of the vehicle, the air conditioning and water heating system operates (812) in a first mode to concurrently heat the water and heat the interior of the vehicle (e.g., as illustrated in FIG. 3E). In some embodiments, the system concurrently heats the water and the interior of the vehicle in accordance with a determination that the user has enabled a heating mode. In some embodiments, the system heats the water without heating the interior of the vehicle in accordance with a determination that the user has disabled a heating mode (e.g., the system disregards the current temperature being below the desired temperature while the heating mode is disabled).

In accordance with a determination that the current temperature of the water is below the desired temperature for the water, and a determination that the current temperature of the interior of the vehicle is above the desired temperature for the interior of the vehicle, the air conditioning and water heating system operates (814) in a second mode to concurrently heat the water and cool the interior of the vehicle (e.g., as illustrated in FIG. 3D). In some embodiments, the system concurrently heats the water and cools the interior of the vehicle in accordance with a determination that the user has enabled a cooling mode. In some embodiments, the system heats the water without cooling the interior of the vehicle in accordance with a determination that the user has disabled the cooling mode (e.g., the system disregards the current temperature being above the desired temperature while the cooling mode is disabled).

In some embodiments, the air conditioning and water heating system receives (816) a user input to disable air conditioning within the vehicle (e.g., a user input to disable heating and cooling functions for the interior of the vehicle). In some embodiments, in accordance with a determination that the current temperature of the water is below the desired temperature for the water, and a determination that the air conditioning is disabled, the system operates in a third mode to heat the water without heating or cooling the interior of the vehicle (e.g., as illustrated in FIG. 3C).

In some embodiments, in accordance with a determination that the current temperature of the water is at, or above, the desired temperature for the water, and a determination that the current temperature of the interior of the vehicle is above the desired temperature for the interior of the vehicle (and optionally a determination that the user has enabled a cooling mode for the interior of the vehicle), the air conditioning and water heating system operates (818) in a fourth mode to cool the interior of the vehicle without heating the water (e.g., as illustrated in FIG. 3A).

In some embodiments, in accordance with a determination that the current temperature of the water is at, or above, the desired temperature for the water, and a determination that the current temperature of the interior of the vehicle is below the desired temperature for the interior of the vehicle (and optionally a determination that the user has enabled a heating mode for the interior of the vehicle), the air conditioning and water heating system operates (820) in a fifth mode to heat the interior of the vehicle without heating the water (e.g., as illustrated in FIG. 3B).

In some embodiments, the air conditioning and water heating system includes one or more valves, and the system changes operating modes in part by adjusting the valve settings. For example, the system includes a first valve (e.g., valve 120) coupling a compressor, an interior coil, and a second valve; and the second valve (e.g., valve 122) couples the first value, the compressor, an exterior coil, and a heat exchanger for the water storage. In this example, in the cooling mode: (1) the first valve and the second valve fluidly couple an outlet of the compressor to the exterior coil; and (2) the first valve fluidly couples the interior coil to an inlet of the compressor. In the heating mode: (1) the first valve fluidly couples an outlet of the compressor to the interior coil; and (2) the second valve fluidly couples the exterior coil to an inlet of the compressor. In the hot water mode: (1) the first valve and the second valve fluidly couple an outlet of the compressor to the heat exchanger; and (2) the second valve fluidly couples the exterior coil to an inlet of the compressor. In the cooling and hot water mode: (1) the first valve and the second valve fluidly couple an outlet of the compressor to the heat exchanger; and (2) the first valve fluidly couples the interior coil to an inlet of the compressor. In the heating and hot water mode: (1) the first valve and the second valve fluidly couple an outlet of the compressor to the heat exchanger; and (2) the second valve fluidly couples the exterior coil to an inlet of the compressor.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art after reading this disclosure, so the ordering and groupings presented herein are not an exhaustive list of alternatives.

It will also be understood that, although the terms first, second, etc. are, in some instances, used herein to describe various elements, these elements should not be limited by these terms. These terms are only used to distinguish one element from another. For example, a first valve could be termed a second valve, and, similarly, a second valve could be termed a first valve, without departing from the scope of the various described embodiments. The first valve and the second valve are both valves, but they are not the same valve unless explicitly stated.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of conditioning air and water within a vehicle, comprising:
   at a vehicular air conditioning and water heating system comprising a refrigerant loop thermally coupled to a water storage tank via a heat exchanger:
   obtaining a desired temperature for an interior of the vehicle;
   obtaining a desired temperature for water in the water storage tank;
   determining a current temperature of the interior of the vehicle;
   determining a current temperature of the water in the water storage tank;
   in accordance with a determination that the current temperature of the water is below the desired temperature for the water, and a determination that the current temperature of the interior of the vehicle is below the desired temperature for the interior of the vehicle, operating the air conditioning and water heating system in a first mode to concurrently heat the water and heat the interior of the vehicle;
   in accordance with a determination that the current temperature of the water is below the desired temperature for the water, and a determination that the current temperature of the interior of the vehicle is above the desired temperature for the interior of the vehicle, operating the air conditioning and water heating system in a second mode to concurrently heat the water and cool the interior of the vehicle;
   receiving a user input to disable air conditioning within the vehicle; and
   in accordance with a determination that the current temperature of the water is below the desired temperature for the water, and a determination that the air conditioning is disabled, operating the air conditioning and water heating system of the vehicle in a third mode to heat the water without heating or cooling the interior of the vehicle.

2. The method of claim 1, further comprising:
   prior to operating the air conditioning and water heating system in the first mode, receiving a user input to operate in a heating mode; and
   wherein the air conditioning and water heating system is operated in the first mode in accordance with the received user input.

3. The method of claim 1, further comprising:
   prior to operating the air conditioning and water heating system in the second mode, receiving a user input to operate in a cooling mode; and
   wherein the air conditioning and water heating system is operated in the second mode in accordance with the received user input.

4. The method of claim 1, further comprising:
   receiving a user input to disable a heating system within the vehicle; and
   in accordance with a determination that the current temperature of the water is below the desired temperature for the water, and a determination that the heating system is disabled, operating the water heating system of the vehicle to heat the water without heating the interior of the vehicle.

5. The method of claim 1, further comprising:
   in accordance with a determination that the current temperature of the water is at, or above, the desired temperature for the water, and a determination that the current temperature of the interior of the vehicle is above the desired temperature for the interior of the vehicle, operating the air conditioning and water heating system in a fourth mode to cool the interior of the vehicle without heating the water.

6. The method of claim 1, further comprising:
   in accordance with a determination that the current temperature of the water is at, or above, the desired temperature for the water, and a determination that the current temperature of the interior of the vehicle is below the desired temperature for the interior of the vehicle, operating the air conditioning and water heating system in a fifth mode to heat the interior of the vehicle without heating the water.

7. A non-transitory computer-readable storage medium storing one or more programs, the one or more programs comprising instructions which, when executed by a vehicular air conditioning and water heating system comprising a refrigerant loop thermally coupled to a water storage tank via a heat exchanger, cause the vehicular air conditioning and water heating system to:
   obtain a desired temperature for an interior of the vehicle;
   obtain a desired temperature for water in the water storage tank;

determine a current temperature of the interior of the vehicle;

determine a current temperature of the water in the water storage tank;

in accordance with a determination that the current temperature of the water is below the desired temperature for the water, and a determination that the current temperature of the interior of the vehicle is below the desired temperature for the interior of the vehicle, operate the air conditioning and water heating system in a first mode to concurrently heat the water and heat the interior of the vehicle;

in accordance with a determination that the current temperature of the water is below the desired temperature for the water, and a determination that the current temperature of the interior of the vehicle is above the desired temperature for the interior of the vehicle, operate the air conditioning and water heating system in a second mode to concurrently heat the water and cool the interior of the vehicle;

receiving a user input to disable air conditioning within the vehicle; and in accordance with a determination that the current temperature of the water is below the desired temperature for the water, and a determination that the air conditioning is disabled, operating the air conditioning and water heating system of the vehicle in a third mode to heat the water without heating or cooling the interior of the vehicle.

8. The non-transitory computer-readable storage medium of claim 7, wherein the one or more programs further comprise instructions which, when executed by the vehicular air conditioning and water heating system, cause the vehicular air conditioning and water heating system to:

prior to operating the air conditioning and water heating system in the first mode, receive a user input to operate in a heating mode; and wherein the air conditioning and water heating system is operated in the first mode in accordance with the received user input.

9. The non-transitory computer-readable storage medium of claim 7, wherein the one or more programs further comprise instructions which, when executed by the vehicular air conditioning and water heating system, cause the vehicular air conditioning and water heating system to:

prior to operating the air conditioning and water heating system in the second mode, receive a user input to operate in a cooling mode; and wherein the air conditioning and water heating system is operated in the second mode in accordance with the received user input.

10. The non-transitory computer-readable storage medium of claim 7, wherein the one or more programs further comprise instructions which, when executed by the vehicular air conditioning and water heating system, cause the vehicular air conditioning and water heating system to:

receive a user input to disable a heating system within the vehicle; and in accordance with a determination that the current temperature of the water is below the desired temperature for the water, and a determination that the heating system is disabled, operate the water heating system of the vehicle to heat the water without heating the interior of the vehicle.

11. The non-transitory computer-readable storage medium of claim 7, wherein the one or more programs further comprise instructions which, when executed by the vehicular air conditioning and water heating system, cause the vehicular air conditioning and water heating system to:

in accordance with a determination that the current temperature of the water is at, or above, the desired temperature for the water, and a determination that the current temperature of the interior of the vehicle is above the desired temperature for the interior of the vehicle, operate the air conditioning and water heating system in a fourth mode to cool the interior of the vehicle without heating the water.

12. The non-transitory computer-readable storage medium of claim 7, wherein the one or more programs further comprise instructions which, when executed by the vehicular air conditioning and water heating system, cause the vehicular air conditioning and water heating system to:

in accordance with a determination that the current temperature of the water is at, or above, the desired temperature for the water, and a determination that the current temperature of the interior of the vehicle is below the desired temperature for the interior of the vehicle, operate the air conditioning and water heating system in a fifth mode to heat the interior of the vehicle without heating the water.

13. The method of claim 1, wherein operating the vehicular air conditioning and water heating system in a respective mode includes adjusting one or more valves of the vehicular air conditioning and water heating system.

14. The method of claim 1, wherein the desired temperature for the interior of the vehicle and/or the desired temperature for the water in the water storage tank are received via an application executing on a user device.

15. The method of claim 14, wherein the desired temperature for the water in the water storage tank is received before, after, or at the same time as the desired temperature for the interior of the vehicle.

16. The non-transitory computer-readable storage medium of claim 7, wherein operating the vehicular air conditioning and water heating system in a respective mode includes adjusting one or more valves of the vehicular air conditioning and water heating system.

17. The non-transitory computer-readable storage medium of claim 7, wherein the desired temperature for the interior of the vehicle and/or the desired temperature for the water in the water storage tank are received via an application executing on a user device.

18. The non-transitory computer-readable storage medium of claim 17, wherein the desired temperature for the water in the water storage tank is received before, after, or at the same time as the desired temperature for the interior of the vehicle.

* * * * *